US008952100B2

(12) United States Patent
Thiele et al.

(10) Patent No.: US 8,952,100 B2
(45) Date of Patent: Feb. 10, 2015

(54) PROCESS TO REMOVE SILANOL FROM THE PREPARATION OF A MODIFIED POLYMER

(75) Inventors: Sven Thiele, Halle (DE); Jochen Boehm, Ottersweier (DE); Norbert Jantsch, Halle (DE); Christiane Berndt, Salzmuende (DE)

(73) Assignee: Styron Europe GmbH, Horgen (CH)

( * ) Notice: Subject to any disclaimer, the term of this patent is extended or adjusted under 35 U.S.C. 154(b) by 927 days.

(21) Appl. No.: 13/128,512

(22) PCT Filed: Nov. 11, 2009

(86) PCT No.: PCT/US2009/063961
§ 371 (c)(1),
(2), (4) Date: May 10, 2011

(87) PCT Pub. No.: WO2010/056694
PCT Pub. Date: May 20, 2010

(65) Prior Publication Data
US 2011/0218300 A1 Sep. 8, 2011

Related U.S. Application Data

(60) Provisional application No. 61/113,301, filed on Nov. 11, 2008.

(51) Int. Cl.
*C08F 2/06* (2006.01)
*C08F 8/42* (2006.01)
*C08F 136/04* (2006.01)
*C08C 2/02* (2006.01)
*C08C 19/44* (2006.01)

(52) U.S. Cl.
CPC .. *C08C 2/02* (2013.01); *C08C 19/44* (2013.01)
USPC ......................................... 525/331.9; 525/54

(58) Field of Classification Search
USPC ................................ 525/331.9, 54
See application file for complete search history.

(56) References Cited

U.S. PATENT DOCUMENTS

| | | | | |
|---|---|---|---|---|
| 2,519,344 | A | * 8/1950 | Berg | ................................ 95/112 |
| 3,169,101 | A | * 2/1965 | Berthoux | ........................ 203/59 |
| 3,484,427 | A | * 12/1969 | Hillman | ........................ 525/339 |
| 3,629,213 | A | 12/1971 | Onishi et al. | |
| 3,951,936 | A | 4/1976 | Hanlon | |
| 4,689,368 | A | 8/1987 | Jenkins | |
| 4,931,376 | A | 6/1990 | Ikematsu et al. | |
| 5,086,136 | A | 2/1992 | Takashima et al. | |
| 5,089,574 | A | 2/1992 | Castner | |
| 5,134,199 | A | 7/1992 | Hattori et al. | |
| 5,448,002 | A | 9/1995 | Castner | |
| 5,753,579 | A | 5/1998 | Jalics et al. | |
| 5,753,761 | A | 5/1998 | Sandstrom et al. | |
| 5,834,573 | A | 11/1998 | Castner | |
| 6,018,007 | A | 1/2000 | Lynch | |
| 6,103,842 | A | 8/2000 | Halasa et al. | |
| 6,184,168 | B1 | 2/2001 | Lynch | |
| 6,310,152 | B1 | 10/2001 | Castner | |
| 6,489,415 | B2 | 12/2002 | Hsu et al. | |
| 6,627,715 | B2 | 9/2003 | Halasa et al. | |
| 6,693,160 | B1 | 2/2004 | Halasa et al. | |
| 6,765,065 | B2 | 7/2004 | Oshima et al. | |
| 7,015,271 | B2 | 3/2006 | Bice et al. | |
| 7,205,360 | B2 | 4/2007 | Robert et al. | |
| 7,342,070 | B2 | 3/2008 | Tsukimawashi et al. | |
| 7,378,193 | B2 | 5/2008 | Kang et al. | |
| 7,488,768 | B2 | 2/2009 | Tardivat et al. | |
| 2003/0065114 | A1 | 4/2003 | Castner | |
| 2003/0176559 | A1 | 9/2003 | Bice et al. | |
| 2004/0019144 | A1 | 1/2004 | Bortolotti et al. | |
| 2004/0054091 | A1 | 3/2004 | Diaz et al. | |

(Continued)

FOREIGN PATENT DOCUMENTS

| | | | | |
|---|---|---|---|---|
| CN | 1917953 A | 2/2007 | ............... | B01J 20/22 |
| EP | 0 661 298 A2 | 7/1995 | | |

(Continued)

OTHER PUBLICATIONS

PCT Search Report mailed Mar. 10, 2010 for corresponding PCT Application No. PCT/US2009/063961.
Haky et al., "*Comparison of Octadecyl-Bonded Alumina and Silica for Reverse-Phase High Performance Liquid Chromatography,*" J. of Chromatography, 505 (1990), 307-318.
A. Taralp et al., "*Cost-Effective Surface Modifications of Silica and Alumina Achieved by Way of a Single In-House Set-Up*" (Abstract), ASC National Meeting, Mar. 2003.
Japanese Office Action dated Dec. 17, 2013 for Japanese Patent Application No. 2011-535782, 5 pages.

(Continued)

*Primary Examiner* — Ling Choi
*Assistant Examiner* — Chun-Cheng Wang
(74) *Attorney, Agent, or Firm* — Brinks Gilson & Lione

(57) ABSTRACT

The invention provides a method for a preparation of a polymer selected from the following: (a) modified interpolymer comprising, in polymerized form, a conjugated diene and an aromatic alpha-olefin, or (b) a modified polymer comprising, in polymerized form, a conjugated diene; and wherein said method comprising at least the following steps: polymerizing monomers comprising at least one conjugated diene monomer in at least one polymerization reactor, in the presence of at least one solvent, to form the polymer, optionally coupling a fraction of the polymer chains using at least one coupling agent, modifying the polymer with at least one modifying agent, in at least one reactor, in the presence of the at least one solvent, to form a modified polymer solution; optionally, contacting the modified polymer solution with at least one proton donating compound; contacting the modified polymer solution with water; removing the at least one solvent; contacting the removed solvent with at least one material that will react with, and/or adsorb, silanol to form a purified solvent, recirculating the purified solvent back to the at least one polymerization reactor or to a storage container.

15 Claims, No Drawings

(56) References Cited

U.S. PATENT DOCUMENTS

| | | | |
|---|---|---|---|
| 2007/0088132 A1* | 4/2007 | Taniguchi et al. | 525/342 |
| 2010/0069568 A1 | 3/2010 | Thiele et al. | |
| 2011/0082253 A1 | 4/2011 | Thiele et al. | |

FOREIGN PATENT DOCUMENTS

| | | | | |
|---|---|---|---|---|
| EP | 0 924 214 | | 6/1999 | |
| EP | 0 964 008 | | 12/1999 | |
| EP | 1 367 069 | | 12/2001 | |
| EP | 1 199 313 | A2 | 4/2002 | |
| EP | 1 726 598 | | 11/2006 | |
| EP | 1726598 | A1 * | 11/2006 | C08C 2/06 |
| GB | 2 199 817 | | 7/1988 | |
| JP | S62-179506 | | 8/1987 | |
| JP | H08-319352 | | 12/1996 | |
| JP | H10-087838 | | 7/1998 | |
| JP | 11130864 | | 5/1999 | |
| JP | 11301794 | | 11/1999 | |
| JP | 2003-171418 | | 6/2003 | |
| JP | 2007126332 | | 5/2007 | |
| WO | WO 97/06192 | | 2/1997 | |
| WO | WO 03/093391 | | 11/2003 | |
| WO | WO 2004/041398 | | 5/2004 | |
| WO | WO 2005/079975 | A1 | 9/2005 | B01J 20/22 |
| WO | WO 2007/047943 | | 4/2007 | |
| WO | WO 2008/076875 | | 6/2008 | |
| WO | WO 2009/148932 | A1 | 12/2009 | |

OTHER PUBLICATIONS

Chinese Office Action dated Aug. 1, 2012, Chinese Application No. 200980145028.1, pp. 1-18, State Intellectual Property Office of the People's Republic of China, Beijing, China.

\* cited by examiner

PROCESS TO REMOVE SILANOL FROM THE PREPARATION OF A MODIFIED POLYMER

REFERENCE TO RELATED APPLICATIONS

This application is a National Stage of International Application PCT/US2009/063961 filed Nov. 11, 2009 which claims the benefit of the filing date under 35 U.S.C. §119(e) of U.S. Provisional Application No. 61/113,301, filed on Nov. 11, 2008. The entirety of both applications is hereby incorporated by reference.

BACKGROUND

The invention relates to a method for silanol removal from a polymerization solvent in a continuous or consecutive batch wise preparation of a modified conjugated diene/alpha-olefin interpolymer or modified conjugated diene polymer preparation.

Modifying agents for the preparation of modified polymers include those modifiers described in the following references: WO2007047943, JP2003-171418, WO03/029299, WO07/047943, International Application No. PCT/US07/087564, and U.S. Provisional Application No. 61/059278. These references describe the use of modifying agents for the preparation of modified polymers. Modified polymers typically comprise phosphorous-silicon bonds, nitrogen-silicon bonds, or sulfur-silicon bonds. The modified polymers and modifying agents can form silanols upon addition of protolyzing agents, such as organic acids, inorganic acids, and water. In a continuous or consecutive batch process, the silanols are recycled with the polymerization solvent back to the reactor for a consecutive polymerization. There is a need for an effective silanol removal process for such polymerizations.

International Publication No. WO2003093391 A1 (Abstract) discloses phase change materials (PCM) comprising at least one top layer on the surface of the PCM, selected among a layer A and a layer B. Layer A consists of at least one inorganic substance that is selected among an oxide, oxide hydrate, hydroxide and a salt that contains OH groups. Layer B consists of at least one coupling reagent. The reference also relates to production methods for producing surface-modified PCM's of this type and to their use in a supporting medium.

International Publication No. WO2004041398 A2 discloses porous inorganic/organic homogenous copolymeric hybrid material materials, including particulates and monoliths, methods for their manufacture, and uses thereof, for example, as chromatographic separations materials.

U.K. Patent Application 2199817 A discloses a coating solution for forming a SiO2 coating which does not contain halogen ion. The coating solution is obtained by reacting an alkoxysilane and/or an oligomer thereof with water, in the presence of a solid acid catalyst and a solvent.

Japanese Patent Application JP11130864 A (Abstract) discloses a method for producing a composite product of an inorganic-organic hybrid with inorganic particles, capable of efficiently forming chemical bonds on the interfaces of the inorganic-organic hybrids and inorganic particles. The particles are dispersed in a solution containing one or two polysiloxanes and an organoalkoxysiane in an organic solvent.

U.S. Publication No. 200310176559 A1 discloses hydrophobic particulate inorganic oxides useful for reinforcing polymeric composition, for example, rubber. The materials are characterized by the following: (a) the substantial absence of functional groups capable of chemical reaction with rubber; (b) a BET surface area in the range of from 40 to 350 m2/g; (c) a hydroxyl content in the range of 2 to 15 OH/nm2; (d) a carbon content in the range from 0.1 to 6 percent by weight that is substantially non-extractable; (e) a pH in the range from 3 to 10; (f) an M1 Standard White Area less than 0.4 percent, and (g) a methanol wettability from 15 to 45 percent. Compositions such as polymers, cured organic rubber articles, master batches and slurries containing the hydrophobic fillers are also described Japanese Patent Application JP2007126332 A (Abstract) discloses a water-repellent glass plate, covered with water-repellent, transparent, fine particles covalently bonded to the surface of the plate. A major portion of the surface of each water-repellent, transparent, fine particle is covered with a water-repellent coat. A portion of the water-repellent, transparent, fine particles are covalently bonded to the surface of a base glass plate through an organic film, a part of which contains a reactive functional group at one end, and is covalently bonded to the surface of each transparent, fine particle through Si at the other end. An organic film, which contains a reactive functional group at one end, is covalently bonded to the base glass plate through Si at the other end.

Cost-Effective Surface Modifications of Silica and Alumina Achieved by Way of a Single In-House Set-Up (Abstract), A. Taralp et al., ASC National Meeting, March 2003, discloses surface functionalized porous silica and alumina. Comparison of Octadecyl-Bonded Alumina and Silica for Reverse-Phase High Performance Liquid Chromatography, J. E. Haky et al., J. of Chromatography, 505 (1990), 307-318, discloses chromatographic properties of an octadecyl-bonded alumina (ODA) high performance liquid chromatography (HPLC) stationary phase. The ODA is compared to conventional octadecylsilica (ODS) stationary phases.

Silanol, when present, reacts with alkyl metal initiator compounds, or with living polymer chains in the process of anionic solution polymerization of conjugated dienes, preferably butadiene, or in the process of anionic solution copolymerization of conjugated dienes with alpha-olefins, preferably of butadiene and styrene. Depending on the silanol concentration, one or more of the following aspects of an anionic polymerization process are deteriorated: (a) the alkyl metal initiator concentration is decreased, and the initiation of the anionic polymerization or copolymerization reaction is negatively influenced, (b) the polymer or copolymer molecular weight characteristics are undesirably altered, (c) the long term production of polymer with consistent polymer characteristics, and thus polymer properties, is hampered, and/or (d) the polymerization reaction is prematurely terminated before achieving the desired monomer conversion. The amount of active initiator compound present in a polymer solution, upon reaction with silanol, is difficult to detect. The use of an additional initiator compound, to correct for initiator lost to reaction with silanol, causes increasing initiator costs. Also the use of an additional initiator compound fraction does not lead to a product qualitatively identical with a product produced without silanol impurity.

Silanols are particularly formed when the modified polymers and modifying agents are exposed to water at a temperature ranging from 90° C. to 150° C. These conditions typically represent those of a steam stripping process, which is the conventional procedure for the isolation of polymer.

Silanols are conventionally removed by using an increased alkyl metal initiator concentration; however this removal process leads to the formation of metal silanolates comprising ionic bonds as shown in Formula 1.

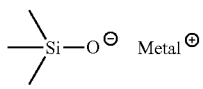

(Formula 1)

Conventional initiator compounds, such as, for example, C1-C6 alkyl lithium initiators, when contacted with silanols, form compounds comprising ionic bonds as shown in Formula 2.

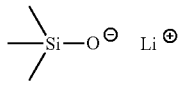

(Formula 2)

Compounds comprising Formula 1 or Formula 2 bonds are rendered silanols again, when contacted with water, such as present in conventional polymer isolation processes. Therefore, in case of consecutive batch or continuous polymerization processes, the silanols can accumulate in the polymerization medium over time. Thus at one point, the reduced number of initiator compounds can not be compensated from the economic point of view.

The conventional polymer isolation processes provide no practical way to reduce and/or eliminate silanols in polymer. This issue is particularly a problem for procedures associated with consecutive batch or continuous polymerization processes. Thus, there is a need for a cost effective and efficient process to remove silanols from a polymerization process. This need and others have been met by the following invention.

SUMMARY OF INVENTION

The invention provides a method for a preparation of a polymer selected from the following: (a) modified interpolymer comprising, in polymerized form, a conjugated diene and an aromatic alpha-olefin, or (b) a modified polymer comprising, in polymerized form, a conjugated diene; and wherein said method comprising at least the following steps:

polymerizing monomers comprising at least one conjugated diene monomer in at least one polymerization reactor, in the presence of at least one solvent, to form the polymer, optionally coupling a fraction of the polymer chains using at least one coupling agent, modifying the polymer with at least one modifying agent, in at least one reactor, in the presence of the at least one solvent, to form a modified polymer solution;

optionally, contacting the modified polymer solution with at least one proton donating compound;

contacting the modified polymer solution with water;

removing the at least one solvent;

contacting the removed solvent with at least one material that will react with, and/or adsorb, silanol to form a purified solvent, recirculating the purified solvent back to the at least one polymerization reactor or to a storage container.

DETAIL DESCRIPTION

As discussed above, the invention provides a method for a preparation of a polymer selected from the following: (a) modified interpolymer comprising, in polymerized form, a conjugated diene and an aromatic alpha-olefin, or (b) a modified polymer comprising, in polymerized form, a conjugated diene; and wherein said method comprising at least the following steps:

polymerizing monomers comprising at least one conjugated diene monomer in at least one polymerization reactor, in the presence of at least one solvent, to form the polymer, optionally coupling a fraction of the polymer chains using at least one coupling agent, modifying the polymer with at least one modifying agent, in at least one reactor, in the presence of the at least one solvent, to form a modified polymer solution;

optionally, contacting the modified polymer solution with at least one proton donating compound;

contacting the modified polymer solution with water;

removing the at least one solvent;

contacting the removed solvent with at least one material that will react with, and/or adsorb, silanol to form a purified solvent, recirculating the purified solvent back to the at least one polymerization reactor or to a storage container.

In one embodiment, the polymerization is a consecutive batch-wise polymerization or a continuous polymerization.

In one embodiment, the polymerization takes place by a consecutive batch wise polymerization.

In one embodiment, the polymerization takes place by a continuous polymerization.

In one embodiment, the at least one reactor of the modification step is the at least one polymerization reactor.

In one embodiment, the at least one proton donating compound is selected from an alcohol, an inorganic acid, or an organic acid.

In one embodiment, the solvent is selected from an alkane, a cycloalkane, an aromatic solvent, or combinations thereof.

In one embodiment, the at least one solvent comprises cyclohexane. In a further embodiment, the at least one solvent further comprises an alkane.

In one embodiment, the polymer is a modified interpolymer comprising, in polymerized form, a conjugated diene and an aromatic alpha-olefin. In a further embodiment, the modified interpolymer further comprises up to 10 weight percent of a non-aromatic mono-olefin and/or up to 10 weight percent of a non-conjugated diolefin, each based on the weight of the modified interpolymer.

In one embodiment, the polymer is a modified polymer comprising, in polymerized form, a conjugated diene. In a further embodiment, the modified polymer further comprises up to 10 weight percent of a non-aromatic mono-olefin and/or up to 10 weight percent of a non-conjugated diolefin, each based on the weight of the modified polymer.

In one embodiment, the polymer is a modified homopolymer comprising, in polymerized form, a conjugated diene.

In one embodiment, the modified polymer is selected from a modified butadiene-styrene interpolymer or a modified polybutadiene.

In one embodiment, the modified polymer is selected from a modified butadiene-styrene copolymer or a modified polybutadiene.

In one embodiment, the modified polymer is a modified butadiene-styrene interpolymer.

In one embodiment, the modified polymer is a modified butadiene-styrene copolymer.

In one embodiment, the modified polymer is a modified polybutadiene.

In one embodiment, the polymer is modified with a polymer chain end modifying agent or a modifying coupling agent.

In another embodiment, the polymer is modified with a polymer chain end modifying agent and a modifying coupling agent.

In yet another embodiment, the polymer is modified with a polymer backbone modifying agent and a modifying coupling agent.

In one embodiment, the solvent is removed from the modified polymer by a steam stripping process.

In one embodiment, the material comprises surface Al—OH and/or surface Si—OH groups, and preferably surface Al—OH groups.

In one embodiment, the material comprises alumina, silica, and/or aluminosilicates.

In one embodiment, the material comprises alumina.

In one embodiment, the alumina capacity ranges from 10 to 100,000 ppm silanol, preferably ranges from 100 to 100,000 ppm silanol, and more ranges from 1,000 to 100,000 ppm silanol.

In one embodiment, the material is contained in a column.

In one embodiment, the material is present in a slurry.

In one embodiment, the silanol is selected from a compound according to Formula 3.

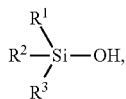

Formula 3 wherein:
Si is silicon; O is oxygen; H is hydrogen;
R1, R2 and R3 are the same or different, and are each, independently, a group having from 1 to 80 nonhydrogen atoms, and which is hydrocarbyl, and wherein each hydrocarbyl group, independently, may be linear or branched, saturated or unsaturated, and wherein each hydrocarbyl group, independently, may be optionally substituted with a (C1-C4) alkyl, a (C1-C4) alkoxy, a (C6-C16) aryl, a (C7-C16) aralkyl, or combinations thereof. In a further embodiment, R1, R2 and R3 are the same or different, and are each, independently selected from the group consisting of the following: —CH3, —CH2CH3, —(CH2)2CH3, —CH(CH3)2, —(CH2)3CH3, —(CH2)4CH3, —(CH2)5CH3, —(CH2)6CH3, —C(CH3)3, —CH2—CH(CH3)2 and —CH2Ph.

In one embodiment, the silanol is selected from one or more of the following compounds:

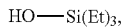 (Formula 4)

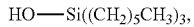 (Formula 5)

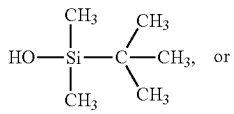 (Formula 6)

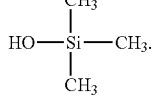 (Formula 7)

In one embodiment, the modifying agent is selected from one or more of the following A) through E):

A) $(R^1O)_3Si-R^4-S-SiR^3_3$, Formula 8 wherein:
Si is silicon; S is sulfur; O is oxygen; N is nitrogen;
$R^4$ is a group selected from a $(C_7-C_{100})$ aralkyl, a $(C_6-C_{100})$ aryl, a $(C_1-C_{100})$ alkyl, or a $(C_2-C_{100})$ dialkylether(alkyl-O-alkyl), and wherein each group is optionally substituted with at least one of the following: a $(C_1-C_4)$ alkyl, a $(C_1-C_4)$ alkoxy, a $(C_6-C_{16})$ aryl, a $(C_7-C_{16})$ aralkyl, an amine, a thioalkyl, or combinations thereof; and wherein each alkyl may be linear or branched, and saturated or unsaturated;
$R^1$ and $R^3$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ tri(hydrocarbyl) silyl, and wherein the hydrocarbyl groups are each, independently, selected from a $(C_1-C_{16})$ alkyl, a $(C_6-C_{16})$ aryl, or a $(C_7-C_{16})$ aralkyl;

B) $(R^{13}O)_3Si-R^9-N(SiR^{10}R^{11}R12)_2$ Formula 9 wherein:
Si is silicon; S is sulfur; O is oxygen; N is nitrogen;
$R^9$ is a group selected from a $(C_7-C_{100})$ aralkyl, a $(C_6-C_{100})$ aryl, a $(C_1-C_{100})$ alkyl, or a $(C_2-C_{100})$ dialkylether(alkyl-O-alkyl), and wherein each group is optionally substituted with at least one of the following: a $(C_1-C_4)$ alkyl, a $(C_1-C_4)$ alkoxy, a $(C_6-C_{16})$ aryl, a $(C_7-C_{16})$ aralkyl, an amine, a thioalkyl, or combinations thereof; and wherein each alkyl may be linear or branched, and saturated or unsaturated;
$R^{10}$, $R^{11}$, $R^{12}$ and $R^{13}$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ tri (hydrocarbyl)silyl, and wherein the hydrocarbyl groups are each, independently, selected from a $(C_1-C_{16})$ alkyl, a $(C_6-C_{16})$ aryl, or a $(C_7-C_{16})$ aralkyl;

C) $(R^1O)_x(R^2)_ySi-R^4-S-SiR^3_3$, Formula 10 wherein:
Si is silicon; S is sulfur; O is oxygen; N is nitrogen,
x is an integer selected from 1, and 2;
y is an integer selected from 1, and 2;

$x+y=3$;

$R^4$ is a group selected from a $(C_7-C_{100})$ aralkyl, a $(C_6-C_{100})$ aryl, a $(C_1-C_{100})$ alkyl, or a $(C_2-C_{100})$ dialkylether(alkyl-O-alkyl), and wherein each group is optionally substituted with at least one of the following: a $(C_1-C_4)$ alkyl, a $(C_1-C_4)$ alkoxy, a $(C_6-C_{16})$ aryl, a $(C_7-C_{16})$ aralkyl, an amine, a thioalkyl, or combinations thereof; and wherein each alkyl may be linear or branched, and saturated or unsaturated;
$R^1$, $R^2$, and $R^3$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ to tri(hydrocarbyl)silyl, and wherein the hydrocarbyl groups are each independently selected from a $(C_1-C_{16})$ alkyl, a $(C_6-C_{16})$ aryl, or a $(C_7-C_{16})$ aralkyl;

D) $(R^{13}O)_p(R^{14})_qSi-R^9-N(SiR^{10}R^{11}R^{12})_2$ Formula 11 wherein:
Si is silicon; S is sulfur; O is oxygen; N is nitrogen,
p is an integer selected from 1, and 2;
q is an integer selected from 1, and 2;
p+q=3;
$R^9$ is a group selected from a $(C_7-C_{100})$ aralkyl, a $(C_6-C_{100})$ aryl, a $(C_1-C_{100})$ alkyl, or a $(C_2-C_{100})$ dialkylether(alkyl-O-alkyl), and wherein each group is optionally substituted with at least one of the following: a $(C_1-C_4)$ alkyl, a $(C_1-C_4)$ alkoxy, a $(C_6-C_{16})$ aryl, a $(C_7-C_{16})$ aralkyl, an amine, a thioalkyl, or combinations thereof; and wherein each alkyl may be linear or branched, and saturated or unsaturated;

$R^{10}$, $R^{11}$, $R^{12}$, $R^{13}$, $R^{14}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each, independently, selected from a ($C_1$-$C_{16}$) alkyl, a ($C_6$-$C_{16}$) aryl, or a ($C_7$-$C_{16}$) aralkyl;

E)

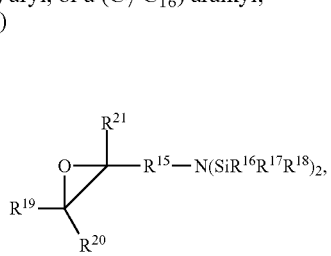

Formula 12 wherein:

Si is silicon; S is sulfur; O is oxygen; N is nitrogen, $R^{15}$ is a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_6$-$C_{16}$) aryl, a ($C_7$-$C_{16}$) aralkyl, an amine, a thioalkyl, or combinations thereof; and wherein each alkyl may be linear or branched, and saturated or unsaturated;

$R^{16}$, $R^{17}$, $R^{18}$, $R^{19}$, $R^{20}$, and $R^{21}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) aryl, a ($C_7$-$C_{16}$) aralkyl, or combinations thereof.

In one embodiment, the modifying agent is selected from compounds of Formula 13:

AS—Y—Z    (Formula 13), wherein

Y is ($C_{12}$-$C_{100}$) alkyl, ($C_{12}$-$C_{100}$) aralkyl, or ($C_{12}$-$C_{100}$) aryl;

S is sulfur;

A is hydrogen, —(S)$_p$—R1 or —SiR2R3R4;

Z is —SH, —S—SiR2R3R4, —S—(S)$_p$—R8, —NR9R10, —NR11COR12, or —COOR14;

p is the number one, two, three, four or five; and

R1, R2, R3, R4, R8, R9, R10, R11, R12 and R14 are the same or different, and are each, independently, selected from hydrogen (H), ($C_1$-$C_{16}$) alkyl, ($C_6$-$C_{16}$) aryl, ($C_7$-$C_{16}$) aralkyl, or ($C_3$-$C_{30}$) tri(hydrocarbyl)silyl. The hydrocarbyl groups are each independently selected from ($C_1$-$C_{16}$) alkyl, ($C_6$-$C_{16}$) aryl, or ($C_7$-$C_{16}$) aralkyl.

In one embodiment, the modifying agent is selected from compounds of Formula 14:

A-S-R'—S-A    (Formula 14), wherein

R' is a ($C_{12}$-$C_{100}$) alkyl, which is linear or branched, a ($C_{12}$-$C_{100}$) aralkyl, or a ($C_{12}$-$C_{100}$) aryl;

S is sulfur;

A is hydrogen, —S—(S)$_p$—R1 or —SiR2R3R4;

p is the number one two or three; and

R1, R2, R3 and R4 are the same or different, and are each, independently, selected from ($C_1$-$C_{16}$) alkyl, ($C_6$-$C_{16}$) aryl, or ($C_7$-$C_{16}$) aralkyl.

In one embodiment, the at least one solvent is contacted with the at least one material, which is contained in at least two columns. In a further embodiment the at least two columns are operated in exchange mode. Exchange mode exemplary means the solvent is passed through the first column, while the second column is not connected to the solvent stream, and the second column is regenerated or refilled and activated. Once the first column that is connected to the solvent stream is exhausted, meaning silanol can not be removed efficiently anymore, the regenerated or refilled and activated second column is connected to the solvent stream again, and the first column is disconnected from the solvent stream.

In one embodiment, the length of each column is, independently, from 1 to 8 meters, preferably from 3 to 6 meters.

In one embodiment, the diameter of each column is, independently, from 0.1 to 1.5 meters, preferably from 0.2 to 1.0 meters.

In one embodiment, the solvent elution rate through each column is, independently, from 1 cm/sec to 2 cm/sec.

In one embodiment, the solvent residence time in each column is, independently, from 1 to 5 minutes.

In one embodiment, the at least one solvent is passed through at least two columns (containing the material) connected in series. In a further embodiment, the capacity of each column to react with, and/or adsorb, silanol is monitored. In one embodiment, the capacity of a column is monitored by gas chromatography of the concentration of silanol in the solvent after passing through the column. A detectable or an increasing value of silanol indicates the column is inefficient for the removal of silanol from the polymerization solvent (for an example, the column is inefficient when a specified amount of silanol (for example, 1 ppm or more) is detected in the solvent). In one embodiment, once a column is exhausted (capacity full), the flow of the at least one solvent by-passes this column, and flows into another column. In a further embodiment, the exhausted column is regenerated or exchanged with new material, and wherein the flow of the at least one solvent is re-routed to again flow into this column.

In one embodiment, the at least one solvent is recycled at a rate from 50 to 70 m³ solvent per hour.

An inventive method may comprise a combination of two or more embodiments as described herein.

Silanols

The term silanol is intended to mean the subject compounds described herein with reference to Formula 3

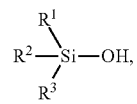

Formula 3 wherein:

Si is silicon; O is oxygen; H is hydrogen;

R1, R2 and R3 are the same or different, and are each, independently, a group having from 1 to 80 nonhydrogen atoms, which is hydrocarbyl, and, wherein each hydrocarbyl group, independently, may be linear or branched, saturated or unsaturated, and wherein to each hydrocarbyl group, independently, may be optionally substituted with (C1-C4) alkyl, (C1-C4) alkoxy, (C7-C16) aryl, (C7-C16) aralkyl.

More particularly R1, R2 and R3 are the same or different, and are each, independently, a hydrocarbyl group having from 1 to 20 non-hydrogen atoms, and wherein each alkyl group, independently, may be linear or branched and saturated or unsaturated, and wherein each hydrocarbyl group, independently, may be optionally substituted with (C1-C4) alkyl, (C6-C16) aryl, (C7-C16) aralkyl, or combinations thereof.

Specific species of the subject silanol include the compounds represented by the following formulas:
(CH3)3Si—OH, (CH3CH2)3Si—OH, (CH3(CH2)2)3Si—OH, ((CH3)2CH)3Si—OH, (CH3(CH2)3)3Si—OH, (CH3(CH2)4)3Si—OH, (CH3(CH2)5)3Si—OH, (CH3(CH2)6)3Si—OH, ((CH3)3C)(CH3)2Si—OH, ((CH3)2CH—CH2)(CH3)2Si—OH, ((CH3)2CH)(CH3)2Si—OH, ((CH3)2CH)2(CH3)Si—OH, ((CH3)2CH—CH2)2(CH3)Si—OH, ((CH3)2CH—CH2)3Si—OH, (PhCH2)(CH3)2Si—OH, (PhCH2)3Si—OH, (Ph)(CH3)2Si—OH, (Ph)2(CH3)Si—OH, (Ph)3Si—OH, and (PhCH2)(Ph)2Si—OH.

More specific species of the subject silanol include the compounds represented by the following formulas: (CH3)3Si—OH, (CH3CH2)3Si—OH, (CH3(CH2)3)3Si—OH, (CH3(CH2)5)3Si—OH, ((CH3)3C)(CH3)2Si—OH, and (Ph)3Si—OH.

The above defined silanols can be formed from —S—SiR3, =N—SiR3 or from =P—SiRi moieties or sites, which are present as functional groups on the polymer, or present on modifier compounds as result of a hydrolysation process. Hydrolyzation occurs in the presence of water or water containing media, and is accelerated in the presence of protolyzing agent, such as, for example, organic acids or inorganic acids.

An alcohol, according to Formula 15, can serve as a protolyzing agent

R4—OH  (Formula 15).

The reaction of an alcohol (Formula 4) with a compound according to Formula 8 to 14, or with a polymer being modified with a compound according to Formula 8 to 14, including but not limited to polymer 8P to 12P and 18P to 20P, may lead to the formation of a compound according to Formula 16.

(Formula 16)

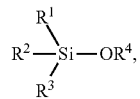

$$R^2—\underset{R^3}{\overset{R^1}{Si}}—OR^4,$$

wherein:
to Si is silicon; O is oxygen; H is hydrogen;
R1, R2, R3 and R4 are the same or different, and are each, independently, a group having from 1 to 80 nonhydrogen atoms, and which is hydrocarbyl, and wherein each hydrocarbyl group, independently, may be linear or branched, saturated or unsaturated, and wherein each hydrocarbyl group, independently, may be optionally substituted with a (C1-C4) alkyl, a (C1-C4) alkoxy, a (C6-C16) aryl, a (C7-C16) aralky, or combinations thereof.

More particularly R1, R2, R3 and R4 are the same or different, and are each, independently, a hydrocarbyl group having from 1 to 20 non-hydrogen atoms, and wherein each alkyl group, independently, may be linear or branched and saturated or unsaturated, and wherein each hydrocarbyl group, independently, may be optionally substituted with a (C1-C4) alkyl, a (C6-C16) aryl, a (C7-C16) aralkyl, or combinations thereof.

Specific preferred R4-groups include the following moieties represented by the following formulas: —CH3, —CH2CH3, —(CH2)2CH3, —CH(CH3)2, —(CH2)3CH3, —(CH2)4CH3, —(CH2)5CH3, —(CH2)6CH3, —C(CH3)3, —CH2—CH(CH3)2 and —CH2Ph.

Protolyzing agents, such as, for example, organic or inorganic acids or water, each when present in a polymer steam stripping process, transfer silylether type compounds according to Formula 5 quantitatively, or at least partially, into silanol compounds according to Formula 3.

Modifying Agents

Modifying agents include compounds according to Formula 17:

AS—Y-Zm  (Formula 17), wherein
Y is a $(C_{12}-C_{100})$ aralkyl, a $(C_{12}-C_{100})$ aryl, a $(C_{12}-C_{100})$ alkyl, or a $(C_{12}-C_{100})$ dialkylether(alkyl-O-alkyl), and wherein each may be optionally substituted with a $(C_1-C_4)$ alkyl, a $(C_1-C_4)$ alkoxy, a $(C_6-C_{16})$ aryl, a $(C_7-C_{16})$ aralkyl, a nitrile, an amine, $NO_2$, an alkoxy, a thioalkyl, or combinations thereof;
S is sulfur;
A is hydrogen, —(S)$_p$—R1 or -MR2R3R4;
Z is —SH, —S-MR5R6R7, —S—(S)$_p$—R8, —NR9R10, —NR11COR12, —O—CO—R13, —NCO, or —COOR14;
M is silicon or tin;
N is nitrogen;
O is oxygen; and
m is the number one, two or three;
p is the number one, two, three four or five; and
R1, R2, R3, R4, R5, R6, R7, R8, R9, R10, R11, R12, R13 and R14 are the same or different, and are each, independently, selected from hydrogen (H), $(C_1-C_{16})$ alkyl, $(C_6-C_{16})$ aryl, $(C_7-C_{16})$ aralkyl, or $(C_3-C_{30})$ tri(hydrocarbyl)silyl. The hydrocarbyl groups are each, independently, selected from $(C_1-C_{16})$ alkyl, $(C_6-C_{16})$ aryl, or $(C_7-C_{16})$ aralkyl. Preferably R1, R2, R3, R4, R5, R6, R7, R8, R9, R10, R11, R12, R13 and R14 are the same or different, and are each, independently, selected from hydrogen (H), $(C_1-C_{16})$ alkyl or trialkylsilyl.

In one embodiment, Y is $(C_{12}-C_{100})$ aralkyl, $(C_{12}-C_{100})$ aryl, $(C_{12}-C_{100})$ alkyl, or $(C_{12}-C_{100})$ dialkylether(alkyl-O-alkyl), and wherein each may be linear or branched, saturated or unsaturated, and optionally substituted with $(C_1-C_4)$ alkyl, $(C_1-C_4)$ alkoxy, $(C_6-C_{16})$ aryl, $(C_7-C_{16})$ aralkyl, nitrile, amine, $NO_2$, alkoxy, thioalkyl, or combinations thereof.

It is understood the Y, as described herein, would be at least divalent.

While not shown in Formula 17, it will be understood that the subject compounds include their corresponding Lewis base adducts (for example, with solvent molecules tetrahydrofurane, dieethylether, dimethoxyethane coordinated with silicon atoms).

The term "aryl," as used herein, refers to at least one aromatic ring, and may also refer to two or more aromatic rings. It is understood that an aryl group used as "Y," as described herein, would be at least divalent.

The term "aryl," as used herein, is understood to include phenyls, biphenyls and other benzenoid compounds, each optionally substituted with alkyl, alkoxy, hydroxyl, or other heteroatoms, such as nitrogen, sulfur and phosphorous.

The term "alkyl," as used herein, refers to at least one aliphatic group, and may also refer to two or more aliphatic groups. The alkyl group may be linear, branched, cyclic, or a combination thereof, and saturated or unsaturated. It is understood that an alkyl group used as "Y," as described herein, would be at least divalent. The term "alkyl," as used herein, is understood to include both straight chain aliphatic hydrocarbon groups, (for example, methyl (Me), ethyl (Et), n-propyl (Pr), n-butyl (Bu), n-pentyl, n-hexyl, etc.), branched aliphatic hydrocarbon groups (for example, isopropyl, tert-butyl, etc.) and carbon based non-aromatic rings, aliphatic hydrocarbon groups. Here, "alkyl" refers to saturated linear, branched, cyclic, or combinations thereof, aliphatic hydrocarbon groups, and unsaturated, linear, branched, cyclic, or combinations thereof, aliphatic hydrocarbon groups.

The term "aralkyl," as used herein, refers to at least one aromatic ring, and also at least one alkyl group. It is understood that an aralkyl group used as "Y," as described herein, would be at least divalent. The term "aralkyl" is understood to mean an aryl group bonded to an alkyl.

The term "alkoxy," as used herein, is understood to include methoxy (MeO), ethoxy (EtO), propoxy (PrO), butoxy (BuO), isopropoxy, isobutoxy, pentoxy, and the like.

The designation of ($C_a$-$C_b$), for example ($C_{12}$-$C_{100}$), as used herein, is intended to mean a range of carbon atoms from a to b, and includes all individual values and subranges from a to b.

In one embodiment, the subject modifier is selected from the class defined by Formula 13:

$$AS-Y-Z \quad \text{(Formula 13)},$$

wherein

Y is ($C_{12}$-$C_{100}$) alkyl, ($C_{12}$-$C_{100}$) aralkyl, or ($C_{12}$-$C_{100}$) aryl;

S is sulfur;

A is hydrogen, $-(S)_p-R1$ or $-SiR2R3R4$;

Z is $-SH$, $-S-SiR2R3R4$, $-S-(S)_p-R8$, $-NR9R10$, $-NR11COR12$, or $-COOR14$;

p is the number one, two, three, four or five; and

R1, R2, R3, R4, R8, R9, R10, R11, R12 and R14 are the same or different, and are each, independently, selected from hydrogen (H), ($C_1$-$C_{16}$) alkyl, ($C_6$-$C_{16}$) aryl, ($C_7$-$C_{16}$) aralkyl or ($C_3$-$C_{30}$) tri(hydrocarbyl)silyl. The hydrocarbyl groups are each, independently, selected from ($C_1$-$C_{16}$) alkyl, ($C_6$-$C_{16}$) aryl, or ($C_7$-$C_{16}$) aralkyl. Preferably R1, R2, R3, R4, R8, R9, R10, R11, R12 and R14 are the same or different, and are each independently selected from hydrogen (H), ($C_1$-$C_{16}$) alkyl or ($C_1$-$C_{16}$) trialkylsilyl; and alkyl especially includes Me, Et, Pr and Bu.

While not shown in Formula 13, it will be understood that the subject compounds include their corresponding Lewis base adducts (for example, with solvent molecules tetrahydrofurane, diethylether, dimethoxyethane coordinated with silicon atoms).

In one embodiment, Y is ($C_{12}$-$C_{100}$) aralkyl, ($C_{12}$-$C_{100}$) aryl, ($C_{12}$-$C_{100}$) alkyl, or ($C_{12}$-$C_{100}$) dialkylether(alkyl-O-alkyl), and wherein each may be linear or branched, saturated or unsaturated, and optionally substituted with ($C_1$-$C_4$) alkyl, ($C_1$-$C_4$) alkoxy, ($C_7$-$C_{16}$) aryl, ($C_7$-$C_{16}$) aralkyl, nitrile, amine, $NO_2$, alkoxy, thioalkyl, or combinations thereof.

It is understood the Y, as described herein, would be at least divalent.

Specific preferred species of the subject modifier include the compounds (and their corresponding Lewis base adducts which are not shown) represented by the following formulae:
$Me_3Si-S-(CH_2)_{18}-S-SiMe_3$, $Et_3Si-S-(CH_2)_{18}-S-SiEt_3$, $(iPr)_3Si-S-(CH_2)_{18}-S-Si(iPr)_3$, $tBu(Me)_2Si-S-(CH_2)_{18}-S-Si(Me)_2tBu$, $nBu(Me)_2Si-S-(CH_2)_{18}-S-Si(Me)_2nBu$, $Ph(Me)_2Si-S-(CH_2)_{18}-S-Si(Me)_2Ph$, $Bz(Me)_2Si-S-(CH_2)_{18}-S-Si(Me)_2Bz$, $(Ph)_3Si-S-(CH_2)_{18}-S-Si(Ph)_3$, $H-S-(CH_2)_{18}-S-SiMe_3$, $H-S-(CH_2)_{18}-S-SiEt_3$, $H-S-(CH_2)_{18}-S-Si(iPr)_3$, $H-S-(CH_2)_{18}-S-Si(Ph)_3$, $H-S-(CH_2)_{18}-S-Si(Me)_2tBu$, $H-S-(CH_2)_{18}-S-Si(Me)_2nBu$, $H-S-(CH_2)_{18}-S-Si(Me)_2Ph$, $H-S-(CH_2)_{18}-S-Si(Me)_2Bz$, $Me_3Si-S-C_6H_{10}-C(Me)_2-C_6H_{10}-S-SiMe_3$, $Et_3Si-S-C_6H_{10}-C(Me)_2-C_6H_{10}-S-SiEt_3$, $(iPr)_3Si-S-C_6H_{10}-C(Me)_2-C_6H_{10}-S-Si(iPr)_3$, $tBu(Me)_2Si-S-C_6H_{10}-C(Me)_2-C_6H_{10}-S-Si(Me)_2tBu$, $nBu(Me)_2Si'S-C_6H_{10}-C(Me)_2-C_6H_{10}-S-Si(Me)_2nBu$, $Ph(Me)_2Si-S-C_6H_{10}-C(Me)_2-C_6H_{10}-S-Si(Me)_2Ph$, $Bz(Me)_2Si-S-C_6H_{10}-C(Me)_2-C_6H_{10}-S-Si(Me)_2Bz$, $(Ph)_3Si-S-C_6H_{10}-C(Me)_2-C_6H_{10}-S-Si(Ph)_3$, $H-S-C_6H_{10}-C(Me)_2-C_6H_{10}-S-SiMe_3$, $H-S-C_6H_{10}-C(Me)_2-C_6H_{10}-S-SiEt_3$, $H-S-C_6H_{10}-C(Me)_2-C_6H_{10}-S-Si(iPr)_3$, $H-S-C_6H_{10}-C(Me)_2-C_6H_{10}-S-Si(Ph)_3$, $H-S-C_6H_{10}-C(Me)_2-C_6H_{10}-S-Si(Me)_3tBu$, $H-S-C_6H_{10}-C(Me)_2-C_6H_{10}-S-Si(Me)_2nBu$, $H-S-C_6H_{10}-C(Me)_2-C_6H_{10}-S-Si(Me)_2Ph$, $H-S-C_6H_{10}-C(Me)_2-C_6H_{10}-S-Si(Me)_2Bz$, $Me_3Si-S-C_6H_4-C(Me)_2-C_6H_4-S-SiMe_3$, $Et_3Si-S-C_6H_4-C(Me)_2-C_6H_4-S-SiEt_3$, $(iPr)_3Si-S-C_6H_4-C(Me)_2-C_6H_4-S-Si(iPr)_3$, $tBu(Me)_2Si-S-C_6H_4-C(Me)_2-C_6H_4-S-Si(Me)_2tBu$, $nBu(Me)_2Si-S-C_6H_4-C(Me)_2-C_6H_4-S-Si(Me)_2nBu$, $Ph(Me)_2Si-S-C_6H_4-C(Me)_2-C_6H_4-S-Si(Me)_2Ph$, $Bz(Me)_2Si-S-C_6H_4-C(Me)_2-C_6H_4-S-Si(Me)_2Bz$, $(Ph)_3Si-S-C_6H_4-C(Me)_2-C_6H_4-S-Si(Ph)_3$, $H-S-C_6H_4-C(Me)_2-C_6H_4-S-SiMe_3$, $H-S-C_6H_4-C(Me)_2-C_6H_4-S-SiEt_3$, $H-S-C_6H_4-C(Me)_2-C_6H_4-S-Si(iPr)_3$, $H-S-C_6H_4-C(Me)_2-C_6H_4-S-Si(Ph)_3$, $H-S-C_6H_4-C(Me)_2-C_6H_4-S-Si(Me)_2tBu$, $H-S-C_6H_4-C(Me)_2-C_6H_4-S-Si(Me)_2nBu$, $H-S-C_6H_4-C(Me)_2-C_6H_4-S-Si(Me)_2Ph$, $H-S-C_6H_4-C(Me)_2-C_6H_4-S-Si(Me)_2Bz$, In the above formulae, the notation "Bz" refers to benzyl ($-CH_2$-Ph or $-CH_2-C_6H_5$).

In one embodiment, the modifying agent is one of the following agents:

A) $(R^1O)_3Si-R^4-S-SiR^3_3$ (Formula 8), wherein:

Si is silicon; S is sulfur; O is oxygen; N is nitrogen;

$R^4$ is a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether(alkyl-O-alkyl), and wherein each group is optionally substituted with at least one of the following: a ($C_1$-$C_4$) alkyl, a ($C_1$-$C_4$) alkoxy, a ($C_6$-$C_{16}$) aryl, a ($C_7$-$C_{16}$) aralkyl, an amine, a thioalkyl, or combinations thereof; and wherein each alkyl may be linear or branched, and saturated or unsaturated, It is understood $R^4$, as described herein, would be at least divalent;

$R^1$ and $R^3$ are the same or different, and are each, independently, selected from hydrogen (H), a ($C_1$-$C_{16}$) alkyl, a ($C_6$-$C_{16}$) aryl, a ($C_7$-$C_{16}$) aralkyl or a ($C_3$-$C_{30}$) tri(hydrocarbyl)silyl, and wherein the hydrocarbyl groups are each, independently, selected from a ($C_1$-$C_{16}$) alkyl, a ($C_6$-$C_{16}$) aryl, or a ($C_7$-$C_{16}$) aralkyl;

B) $(R^{13}O)_3Si-R^9-N(SiR^{10}R^{11}R^{12})_2$ (Formula 9)

wherein:

Si is silicon; S is sulfur; O is oxygen; N is nitrogen;

$R^9$ is a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether(alkyl-O-alkyl), and wherein each group is optionally substituted with at least one of the following: a ($C_1$-$C_4$) alkyl, a ($C_1$-$C_4$) alkoxy, a ($C_6$-$C_{16}$) aryl, a ($C_7$-$C_{16}$) aralkyl, an amine, a thioalkyl, or combinations thereof; and wherein each alkyl may be linear or branched, and saturated or unsaturated, It is understood $R^9$, as described herein, would be at least divalent;

$R^{10}$, $R^{11}$, $R^{12}$ and $R^{13}$ are the same or different, and are each, independently, selected from hydrogen (H), a ($C_1$-$C_{16}$) alkyl, a ($C_6$-$C_{16}$) aryl, a ($C_7$-$C_{16}$) aralkyl or a ($C_3$-$C_{30}$) tri(hydrocarbyl)silyl, and wherein the hydrocarbyl groups are each, independently, selected from a ($C_1$-$C_{16}$) alkyl, a ($C_6$-$C_{16}$) aryl, or a ($C_7$-$C_{16}$) aralkyl;

C) $(R^1O)_x(R^2)_ySi-R^4-S-SiR^3_3$ (Formula 10), wherein:
Si is silicon; S is sulfur; O is oxygen; N is nitrogen,
x is an integer selected from 1, and 2;
y is an integer selected from 1, and 2;
x+y=3;
$R^4$ is a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether(alkyl-O-alkyl), and wherein each group is optionally substituted with at least one of the following: a ($C_1$-$C_4$) alkyl, a ($C_1$-$C_4$) alkoxy, a ($C_6$-$C_{16}$) aryl, a ($C_7$-$C_{16}$) aralkyl, an amine, a thioalkyl, or combinations thereof; and wherein each alkyl may be linear or branched, and saturated or unsaturated, It is understood $R^4$, as described herein, would be at least divalent;

$R^1$, $R^2$, and $R^3$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) aryl, or a ($C_7$-$C_{16}$) aralkyl;

D) 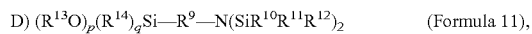 (Formula 11), wherein:
Si is silicon; S is sulfur; O is oxygen; N is nitrogen,
p is an integer selected from 1, and 2;
q is an integer selected from 1, and 2;
p+q=3;
$R^9$ is a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether(alkyl-O-alkyl), and wherein each group is optionally substituted with at least one of the following: a ($C_1$-$C_4$) alkyl, a ($C_1$-$C_4$) alkoxy, a ($C_6$-$C_{16}$) aryl, a ($C_7$-$C_{16}$) aralkyl, an amine, a thioalkyl, or combinations thereof; and wherein each alkyl may be linear or branched, and saturated or unsaturated, It is understood $R^9$, as described herein, would be at least divalent;

$R^{10}$, $R^{11}$, $R^{12}$, $R^{13}$, $R^{14}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) aryl, or a ($C_7$-$C_{16}$) aralkyl;

E)

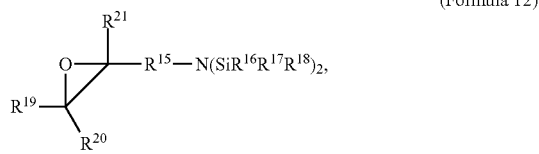 (Formula 12)

wherein:
Si is silicon; S is sulfur; O is oxygen; N is nitrogen,
$R^{15}$ is a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether (alkyl-O-alkyl), and wherein each group is optionally substituted with at least one of the following: a ($C_1$-$C_4$) alkyl, a ($C_1$-$C_4$) alkoxy, a ($C_6$-$C_{16}$) aryl, a ($C_7$-$C_{16}$) aralkyl, an amine, a thioalkyl, or combinations thereof; and wherein each alkyl may be linear or branched, and saturated or unsaturated, It is understood $R^{15}$, as described herein, would be at least divalent;

$R^{16}$, $R^{17}$, $R^{18}$, $R^{19}$, $R^{20}$, and $R^{21}$ are the same or different, and are each, independently, selected from hydrogen (H), a ($C_1$-$C_{16}$) alkyl, a ($C_6$-$C_{16}$) aryl, a ($C_7$-$C_{16}$) aralkyl, or a ($C_3$-$C_{30}$) tri(hydrocarbyl)silyl, and wherein the hydrocarbyl groups are each independently selected from a ($C_1$-$C_{16}$) alkyl, a ($C_6$-$C_{16}$) aryl, a ($C_7$-$C_{16}$) aralkyl, or combinations thereof.

Additional modifying agents include the following compounds:

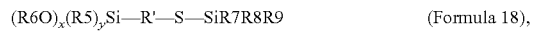 (Formula 18),

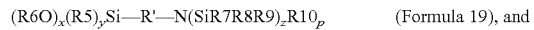 (Formula 19), and

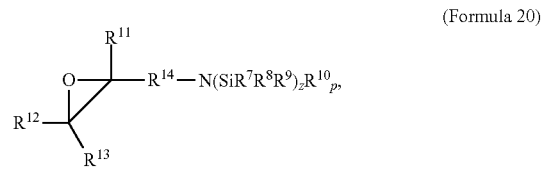 (Formula 20)

wherein
Si is silicon; S is sulfur; O is oxygen; N is nitrogen;
x is an integer selected from 1, 2 and 3;
y is an integer selected from 0, 1, and 2;
x+y=3; z is an integer selected from 1 or 2,
p is an integer selected from 0 or 1 and z+p=2;
R' and $R^{14}$ are each, independently, a group selected from a ($C_7$-$C_{100}$) aralkyl, a ($C_6$-$C_{100}$) aryl, a ($C_1$-$C_{100}$) alkyl, or a ($C_2$-$C_{100}$) dialkylether(alkyl-O-alkyl), and wherein each group is optionally substituted with at least one of the following: a ($C_1$-$C_4$) alkyl, a ($C_1$-$C_4$) alkoxy, a ($C_6$-$C_{16}$) aryl, a ($C_7$-$C_{16}$) aralkyl, an amine, a thioalkyl, or combinations thereof; and wherein each alkyl may be linear or branched, and saturated or unsaturated.

It is understood that R' and $R^{14}$, each as described herein, would be at least divalent.

The R5, R6, R7, R8, R9, R10, R11, R12 and R13 are the same or different and are each, independently, selected from hydrogen (H), (C1-C16) alkyl, (C6-C16) aryl, (C7-C16) aralkyl or (C3-C30) tri(hydrocarbyl)silyl, and wherein the hydrocarbyl groups are each independently selected from (C1-C16) alkyl, (C6-C16) aryl, (C7-C16) aralkyl, or combinations thereof.

The R5, R6, R7, R8, R9, R10, R11, R12 and R13 are preferably (C1-C16) alkyl, more preferably (C1-C8) alkyl and most preferably (C1-C5) alkyl especially including: Me, Et, Pr and Bu; and R' and R14 are (C7-C100) aralkyl, (C6-C100) aryl, (C1-C100) alkyl, or (C2-C100) dialkylether (alkyl-O-alkyl), and wherein each may be linear or branched, saturated or unsaturated, and optionally substituted with (C1-C4) alkyl, (C1-C4) alkoxy, (C6-C16) aryl, (C7-C16) aralkyl, nitrile, amine, NO2, alkoxy, or thioalkyl; preferably (C1-C16) alkyl, and more preferably (C1-C5) alkyl.

Modified Polymers

Modified polymers, prior to hydrolysis, include, but are not limited to, the following polymers below.

A) Polymer after modification using modifier 20:

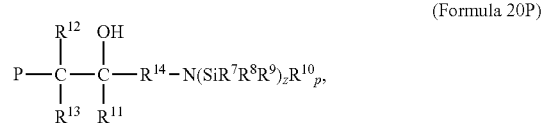 (Formula 20P)

wherein P is a polymer chain, and wherein all the other letters are as described above.

B) Polymer after modification using modifier 19:

(P)r-(R6O)$_q$(R5)$_y$Si—R'—N(SiR7R8R9)$_z$R10$_p$ (Formula 19P), wherein P is a polymer chain, r is 1 or 2, and q is 0 or 1, and wherein all the other letters are as described above.

C) Polymer after modification using modifier 18:

(P)$_u$—(R6O)$_z$(R5)$_y$Si—R'—S—SiR7R8R9 (Formula 18P)

wherein P is a polymer chain, u is 1 or 2, and z is 0 or 1, and wherein all the other letters are as described above.

D) Polymer after modification using modifier 12:

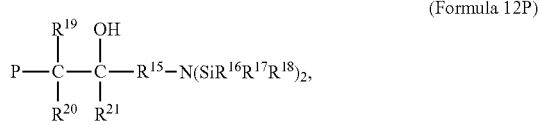
(Formula 12P)

wherein P is a polymer chain, and wherein all the other letters are as described above.

E) Polymer after modification using modifier 11:

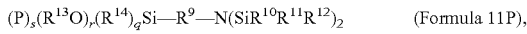
(P)$_s$(R$^{13}$O)$_r$(R$^{14}$)$_q$Si—R$^9$—N(SiR$^{10}$R$^{11}$R$^{12}$)$_2$ (Formula 11P), wherein P is a polymer chain and s is 1 or 2 and r is 0 or 1 and wherein all the other letters are as described above.

F) Polymer after modification using modifier 10:

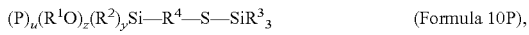
(P)$_u$(R$^1$O)$_z$(R$^2$)$_y$Si—R$^4$—S—SiR$^3$$_3$ (Formula 10P)

wherein P is a polymer chain, u is 1 or 2, and z is 0 or 1, and wherein all the other letters are as described above.

G) Polymer after modification using modifier 9:

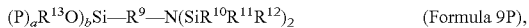
(P)$_a$R$^{13}$O)$_b$Si—R$^9$—N(SiR$^{10}$R$^{11}$R$^{12}$)$_2$ (Formula 9P)

wherein P is a polymer chain, a is 1, 2 or 3, and b is 0, 1 or 2, and wherein all the other letters are as described above.

H) Polymer after modification using modifier 8:

(P)$_a$(R$^1$O)$_b$Si—R$^4$—S—SiR$^3$$_3$ (Formula 8P), wherein P is a polymer chain, a is 1, 2 or 3, and b is 0, 1 or 2, and wherein all the other letters are as described above.

While not shown in Formulas 8P-12P and 18P-20P, it will be understood that the subject compounds include their corresponding Lewis base adducts (e.g. with solvent molecules tetrahydrofurane, diethylether, dimethoxyethane coordinated with silicon atoms). Specific preferred species of the subject modifier include the compounds (and their corresponding Lewis base adducts which are not shown) incorporated in patent applications WO 08/076875, WO 07/047943, WO 03/029299, JP2003-171418 and U.S. Provisional Application No. 61/059278, each incorporated herein by reference.

Modified polymers according to Formulas 8P-12P and 18P-20P prepared from polymers and modifier agents according to Formulas 8A-12A and 18A-20A, respectively, in solution, also form silanols according to Formula 3, upon addition of protolyzing agent, including, but not limited to, organic or inorganic acids or water.

Modified polymers according to Formulas 8P-12P and 18P-20P containing moieties derived from modifier agents according to Formulas 8A-12A and 18A-20A, respectively, also form silylether type compounds according to Formula 16 upon addition of alcohols according to Formula 15.

Protolyzing agents, including, but not limited to, organic acids, inorganic acids, or water, present in a polymer steam stripping process convert silylether compounds according to Formula 16, quantitatively, or at least partially, into silanol compounds according to Formula 3.

Alumina

It has been discovered that a "silanol-catching agent," such as alumina, silica, alumosilicates, or molecular sieves, can be used to eliminate silanol from the solvent in a consecutive batch or continuous polymerization process. In particular, silanol impurities can be removed from a polymerization solvent used in a consecutive batch or continuous production of a modified conjugated diene-alpha olefin interpolymer or modified conjugated diene homopolymer. In a preferred process, the polymer is a modified butadiene-styrene copolymer or a modified polybutadiene.

The "silanol-catching agent," such as alumina, prevents the need for an addition of a continuously increased alkyl metal initiator concentration for use as "silanol-neutralizing agent," and therefore saves initiator cost. In addition, the use of alumina for silanol elimination simplifies the assessment of the initiator compound concentration, required for the next batch polymerization, in a consecutive batch polymerization process, and/or simplifies the assessment of the initiator concentration in a consistent long term continuous anionic polymerization process. Thus, the use of alumina as a "silanol-catching agent" leads to a technical feasible, economic, and easy controllable anionic solution polymerization process.

In one embodiment, silanol compounds are efficiently removed through contact with activated aluminum oxide (also called alumina). A typical activated aluminum oxide or alumina (Al2O3) is produced by mild calcination of aluminum hydroxide (aluminum trihydrate, boehmite), which is an intermediate in the industrial production of aluminum from Bauxite. It is precipitated (crystallized) from a sodium aluminate solution. By heating the aluminum hydroxide, obtained at temperatures from 450° C. to 500° C., about 33 percent constitutional water can be removed, whereby the crystal structure of the boehmite remains intact.

In addition, for solvent purification, activated alumina can be used to remove water from organic solvents. Such water is adsorbed in the empty cavities of alumina. Activated alumina can contain different amounts of water, depending on the activation conditions, such as, for example, the activation temperature and the duration of the activation period. The water content may range from 0.5 to 20 percent. Depending on the water concentration in alumina, different alumina activities, also called Brockmann activities [for example, see Sigma-Aldrich webpage :nhttp://wvvw.sigmaaldrich.com/Brands/Aldrich/Tech_Bulletins/AL_143/Activated_Alumina.html].

Preferably the highest alumina activity towards water is achieved with the alumina having the lowest water content. In the case of the lowest water concentration, the alumina cavities are empty, and can be occupied by water or other polar compounds.

Alumina comprises bonded hydroxyl groups on the surface of the alumina, for example, as shown in Formula 1B below

(Formula 1B)

It has been discovered that the bonded hydroxyl groups can condensate with molecules comprising metal-OH groups, particularly Al—OH or Si—OH groups, and form stable chemical moieties according to, for example, Formula 2B or Formula 3B, below, which cannot be reconverted at high temperatures.

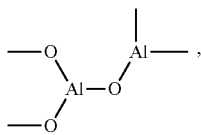

(Formula 2B)

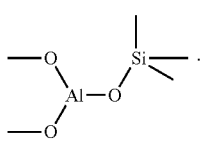

(Formula 3B)

Accordingly, two mechanisms lead to an efficient removal of silanol compounds present in a nonpolar solvent:

A) covalent bond formation through condensation of the silanol Si—OR group with Al—OH groups located at the alumina surface, and B) adsorption of silanol molecules in the empty cavities of activated alumina.

Both mechanisms A) and B) are required to efficiently remove different types of silanols. It should be anticipated, that the contribution of mechanism A) increases with an increasing nonpolarity of the silanols, such as by silanols with growing alkyl groups. Though both long chain and short chain silanols react with Al—OH groups located at the alumina surface, the tendency to adsorb less polar groups in alumina cavities decreases. In addition, the degree of silanol adsorption depends on the size of the alumina cavities. If the cavities are too large the mechanism A) still takes place, while the tendency to keep silanol molecules in cavities, based on polar group interactions would be low. Thus, for an efficient silanol removal from a solvent, the cavity size is essential as well.

Depending on the hydroxyl or acid anion group concentration, such as, for example, the chloride anion concentration, on the surface of alumina, different alumina grades with different pH values are obtained. Generally alumina grades with pH-values from pH 11 to pH 3 are available. Although the pH of an aluminum has not shown a significant effect on the reduction of silanol present in a nonpolar solvent, preferably, alumina grades with a neutral pH-value, that is pH=7 or close to pH=7, are used for an efficient silanol removal. Accordingly, the condensation reaction of the silanol with the —OH groups located on the alumina surface must not necessarily be acid catalyzed.

The important role of the mechanism A (stable bond formation) for the silanol removal is demonstrated in a comparative experiment using a siloxane. Exemplary hexamethyldisiloxane is contacted with alumina, but no reduction of the siloxane concentration in the nonpolar solvent could be measured. No reactive group is available to react under covalent bond formation on the alumina surface according to, or similar to, mechanism A. In addition, the polar Si—O—Si bond present in siloxanes proved not to be sufficiently polar to adsorb molecules in alumina cavities (mechanism B).

In one embodiment, the alumina has pore volumes ranging from 0.1 to 0.5 mL/g, a mean pore diameter ranging from 0.15 to 0.7 Å, and a specific surface area from 50 to 300 m²/g.

In one embodiment, the aluminum is selected from compounds listed below in Table 1.

TABLE 1

| Alumina Grades (webpage of CAMAG) | | | |
|---|---|---|---|
| | Grade | | |
| | 5016-A basic | 507-C neutral | 504-C acidic |
| pH of a 5% aqueous suspension (stirred) | 9.5 ± 0.5 | 7.0 ± 0.5 | 4.5 ± 0.5 |
| Specific surface [m2/g] | 150 ± 10% | 150 ± 10% | 150 ± 10% |
| Brockmann activity | any | any | any |
| Mean pore diameter [Å] | 60 | 60 | 60 |
| Pore volume [mL/g] | ~0.25 | ~0.25 | ~0.25 |
| Cl' [mval/g] | nil | 0.03 | 0.14 |
| Fe2O3 [%] | 0.01-0.03 | 0.01-0.03 | 0.01-0.03 |
| Na2O [%] | 0.25-0.4 | 0.25-0.4 | 0.25-0.4 |
| Bulk density [g/L] | ~920 | ~920 | ~920 |

In one embodiment, the alumina has a mean pore diameter from 40 Angstroms to 80 Angstroms, preferably from 50 Angstroms to 70 Angstroms.

In one embodiment, the alumina has a pore volume from 0.1 to 0.5 mL/g, preferably from 0.2 to 0.3 mL/g.

It has been discovered that contacting silanols with alumina, efficiently removes silanols formed as impurities in the production process of modified polymers.

In one embodiment, the use of an alumina bed technology is preferred. In a further embodiment, the alumina is placed in at least one column. The "silanol containing polymerization solvent," including both the solvent removed from a solvent containing polymer solution, as well as the solvent derived from solvent storage vessels, can be passed through the activated alumina containing column.

In one embodiment, the alumina containing column can be heated up to a temperature in the range of 100° C. to 500° C., under inert conditions, for an at least partial alumina activation and regeneration. The activation procedure removes from the alumina most of the adsorbed compounds, such as, for example, water, alcohols and silanols. Depending on the type of silanol present in the solvent, the silanol contacted alumina may not achieve its original capacity. A reduced capacity can be explained with a reduction of available alumina surface Al—OR groups. The structure of the silanol compound which needs to be removed from a solvent determines the type of alumina needed for an efficient silanol removal process. In the case of a silanol removal mechanism that functions predominantly by mechanism A, the alumina needs to be replaced more frequently by new alumina to maintain a constant high silanol removal performance. The technical process, for example, must not be interrupted or stopped for alumina exchange, when there are two or more alumina columns in parallel, which can be used in change.

In one embodiment, silanols are removed in one or more slurry vessels each containing alumina. In a further embodiment, for a batch wise operation, the polymerization solvent is stirred with activated alumina for a predetermined period, and subsequently the solvent is distilled off, filtered off, or removed through the application of a reduced pressure, with minimal disturbance of a settled solid alumina phase. In another embodiment, for a continuously operating vessel containing an alumina slurry, the polymerization solvent is removed from the slurry vessel when the required dwell period is achieved.

Typically, from 1 to 100, preferably from 10 to 100, more preferably from 30 to 100 mole percent silanol, relative to the modifier added to the polymer containing solution, are formed in the course of the polymer preparation process.

Typically from 1 to 500 ppm, more often from 1 to 250 ppm, and even more often from 1 to 120 ppm silanol are present in the polymerization solvent after completing the polymer work up process, which includes a completed steam stripping process. Typically from 1 to 500 tons, preferably 1 to 100 tons, or more preferably from 3 and 75 tons of recovered "silanol-containing polymerization solvent," per hour, need to be purified from silanol. Typically, solvent, free of polymer, is purified to remove silanol.

In one embodiment, the alumina concentration needs to be adjusted to a silanol to alumina concentration in the range of 10 to 100000 ppm, preferably from 100 to 70000 ppm, and more preferably from 1000 to 50000 ppm (1000 to 50000 mg silanol/kg alumina). For example, if there are 10 ton of polymerization solvent containing 30 ppm (300 g) silanol, the alumina concentration needs to be in the range from 6 kg alumina (for 50000 ppm silanol with respect to alumina) to 300 kg alumina (for 1000 ppm silanol with respect to alumina).

In one embodiment, the weight ratio of alumina to silanol, per 100 grams of solvent, is from 300/1 to 25/1, preferably from 250/1 to 40/1, and more preferably from 200/1 to 50/1.

In one embodiment, the operation temperature of a column containing the alumina is from 0° C. to 150° C., preferably from 10° C. to 100° C., and most preferably from 20° C. to 80° C.

In one embodiment, the operation temperature of an "alumina containing solvent slurry" is from 0° C. to 150° C., preferably from 10° C. to 100° C., and most preferably from 20° C. to 80° C.

In one embodiment, the alumina is heated to a temperature from 100° C. to 500° C., under an inert atmosphere, for alumina activation and regeneration.

In one embodiment, the modifying agent is added at a polymerization conversion rate of more than 80 percent, and more preferably at a conversion rate of more than 90 percent.

In one embodiment, the modifying agent is added intermittently (at regular or irregular intervals) during the polymerization. In a further embodiment, the modifying agent is added at a polymerization conversion rate of more than 80 percent, and more preferably at a conversion rate of more than 90 percent.

In one embodiment, the modifying agent is added continuously during the polymerization. In a further embodiment, the modifying agent is added at a polymerization conversion rate of more than 80 percent, and more preferably at a conversion rate of more than 90 percent.

In one embodiment, the modified polymer comprises from 0.0005 to 0.300 mmole of moieties, derived from the added modifier agent, per gram polymer. Preferably the modified polymer comprises from 0.0010 to 0.100 mmole of moieties, derived from the added modifier agent, per gram polymer. Even more preferably the modified elastomeric polymer preferably comprises from 0.0015 to 0.050 mmole of moieties, derived from the added modifier agent, per gram polymer.

In one embodiment, from 0.1 to 99.9 weight percent of the total amount of modifying agent used, reacts to form modified polymers, in the course of the preparation of the modified polymer.

In one embodiment, for the modification of polymer chain ends, from 30 to 99.9 weight percent of the total amount of modifying agent used, reacts to form modified polymers in the course of the preparation of the modified polymer.

In another embodiment, to the unmodified polymer is added a backbone modifier, e.g. according to Formulas 13, 14 and 17, in the amount from 0.0050 to 0.700 mmol/g of unmodified polymer, preferably from 0.0080 to 0.50 mmol/g of unmodified polymer, and more preferably 0.010 to 0.35 mmol/g of unmodified polymer.

Ranges for modifying agents, monomer to initiator ranges, polymerization temperature, and polymerization processes, and the like, are disclosed in WO 08/076875, WO 07/047943, and International Application No. PCT/US2009/045553 (U.S. Provisional Application No. 61/059278), each incorporated herein by reference.

Polymerizations

In general, the polymerization of the diene monomer(s), or polymerization of the diene monomer(s) with the α-olefin monomer(s), may be accomplished at conditions well known in the art for anionic living type polymerization reactions, for metal complex catalyst based polymerization reactions, or for radical emulsion polymerization reactions. For such polymerizations, typical temperatures are from −50 to 250° C., preferably from 0 to 120° C. The reaction temperature may be the same as the polymerization initiation temperature. The polymerization can be effected at atmospheric pressure, at sub-atmospheric pressure, or at elevated pressures of up to, or even higher than, 500 MPa, continuously or discontinuously. Preferably, the is polymerization is performed at pressures from 0.01 and 500 MPa, more preferably from 0.01 and 10 MPa, and most preferably from 0.1 and 2 MPa. Higher pressures can be applied. In such a high-pressure process, the initiator according to the present invention, can also be used with good results. Solution polymerizations normally take place at lower pressures, preferably below 10 MPa. The polymerization can be carried out in the gas phase, as well as in a liquid reaction medium.

The polymerization is generally conducted under batch, continuous or semi-continuous polymerization conditions. The polymerization can be conducted as a solution polymerization, wherein the polymer formed is substantially soluble in the reaction mixture, or a suspension/slurry polymerization, wherein the polymer formed is substantially insoluble in the reaction medium, or as a so-called bulk polymerization process, in which an excess of monomer to be polymerized, is used as the reaction medium.

Polymerization of monomer, in case of anionic living type polymerization reactions, is typically initiated with an anionic initiator, such as, but not limited to, an organo metal compound having at least one lithium, sodium or potassium atom, and where the organo metal compounds contain from 1 to about 20 carbon atoms. Preferably the organo metal compound has at least one lithium atom, such as, for example, ethyl lithium, propyl lithium, n-butyl lithium, sec-butyl lithium, tert-butyl lithium, phenyl lithium, hexyl lithium, 1,4-dilithio-n-butane, 1,3-di(2-lithio-2-hexyl)benzene, and preferably n-butyl lithium and sec-butyl lithium.

Polar coordinator compounds may be optionally added to the polymerization mixture to adjust the microstructure (the content of vinyl bond) of the conjugated diolefin portion of diolefin-type homopolymer, copolymer, or terpolymer, or to adjust the composition distribution of the aromatic vinyl compound in the conjugated diene monomer containing copolymer, or terpolymer, and thus, for example, to serve as randomizer component. Polar coordinator compounds include, but not limited to, ether compounds, such as diethyl ether, di-n-butyl ether, ethylene glycol diethyl ether, ethylene glycol dibutylether, diethylene glycol dimethyl ether, propylene glycol dimethyl ether, propylene glycol diethyl ether, propylene glycol dibutylether, and tetrahydrofuran.

The polymerization can optionally include accelerators to increase the reactivity of the initiator, to randomly arrange aromatic vinyl compounds introduced in the polymer, or to provide a single chain of aromatic vinyl compounds, and thus influencing the composition distribution of the aromatic vinyl compounds in a conjugated diene containing modified copolymer or terpolymer. Examples of applicable accelerators include, but are not limited to, sodium alkoxides or sodium phenoxides and potassium alkoxides or potassium phenoxides.

An alkali metal alkoxide compound may also be added together with the polymerization initiator, to increase the polymerization reactivity. Alkali metal alkoxide compound are exemplary represented by metal alkoxides of tetrahydrofurfuryl alcohol, N,N-dimethyl ethanolamine, N,N-diethyl ethanolamine, 1-piperazine ethanolamine, or the like.

For solution based polymerization processes, the polymerization is conducted in a suitable solvent, dispersion agents or diluent. Non-coordinating, inert liquids are preferred, including, but not limited to, straight and branched-chain hydrocarbons such as propane, butane, isobutane, pentane, hexane, heptane, octane, cyclic and alicyclic hydrocarbons, such as cyclohexane, cycloheptane, methylcyclohexane, methylcycloheptane, aromatic and alkyl-substituted aromatic compounds, such as benzene, toluene, and xylene and isomers of the foregoing, and mixtures thereof, as well as pentamethyl heptane or mineral oil fractions such as light or regular petrol, naphtha, kerosene or gas oil.

To further control polymer molecular weight and polymer properties, a coupling agent or linking agent may be employed. For example, a tin halide, a silicon halide, a tin alkoxide, a silicon alkoxide, or a mixture of the aforementioned compounds, can be continuously added during the polymerization in cases where asymmetrical coupling is desired. This continuous addition is normally done in a reaction zone, separate from the zone where the bulk of the polymerization is occurring. The coupling agent can be added in a hydrocarbon solution, for example, cyclohexane, to the polymerization admixture with suitable mixing for distribution and reaction. The coupling agent will typically be added only after a high degree of conversion has already been attained. For instance, the coupling agent will normally be added only after a monomer conversion of greater than about 85 percent has been realized. It will typically be preferred for the monomer conversion to reach at least about 90 percent before the coupling agent is added. Common halide coupling agents include tin tetrachloride, tin tetrabromide, tin tetrafluoride, tin tetraiodide, silicon tetrachloride, silicon tetrabromide, silicon tetrafluoride, silicon tetraiodide, tin and silicon trihalides or tin and silicon dihalides can also be used.

Different types of modifier agents, as described herein can be used to form modified polymers. All modifiers, regardless of the specific type and function, have at least one labile or water sensitive moiety in common. The labile or water sensitive moiety comprises a heteroatom-silicon bond, preferably being one of the following bonds: a phosphorous-silicon bond, a nitrogen-silicon bond, or a sulfur-silicon bonds.

These modifiers (and also polymers formed by using the modifiers) form silanols upon addition of protolyzing agents, such as organic acids, inorganic acids, and water.

Mentioned modifiers can be divided into the following classes of modifiers:
A) backbone modifier agents include modifiers of the Formulas 13, 14 and 17 (see also WO08/076875).
B) chain-end modifier agents include modifiers of the Formulas 10, 11, 12, 18, 19 and 20 (see also WO07/047943 and U.S. Provisional 61/059278 (now PCT/US2009/045553)).
C) modified coupling agents include modifiers of the Formulas 8 and 9 (see also U.S. Provisional 61/059278).

Modifiers of category A) modify the polymer backbone either in the course of the preparation of un-crosslinked polymers or in the course of the preparation of crosslinked-elastomeric polymers.

Modifiers of category B) modify living or anionic polymer chain ends forming chain end-modified polymers.

Modifiers of category C) react with two or more living or anionic polymer chains and form modified branched polymers.

The term "modified polymer," as used herein, refers to a polymer that has reacted with one or more modifying agents, as described herein.

The term "composition," as used herein, includes a mixture of materials which comprise the composition, as well as reaction products and decomposition products formed from the materials of the composition.

The term "polymer" is used herein to indicate, a homopolymer (one monomer type), a copolymer (two monomer types), or a terpolymer (three monomer types), and the like. The term "polymer" as used herein includes interpolymers as described below.

The term "interpolymer," as used herein, refers to polymers prepared by the polymerization of at least two different types of monomers. The generic term interpolymer thus includes copolymers, employed to refer to polymers prepared from two different types of monomers, and polymers prepared from more than two different types of monomers.

Polymers, and preferably elastomeric polymers, can be divided into two groups "cross-linked elastomeric polymers" and "uncrosslinked elastomeric polymers".

The term "crosslinked polymer, preferably crosslinked elastomeric polymer" is intended to mean elastomers or rubbers, representing at least partially cross-linked polymers having properties as known for, or similar to, vulcanized natural rubber (cis-1,4 polyisoprene); for example, stretch under tension and retract relatively quickly to approximately the original length when released. The polymer cross-links are for example formed through vulcanization using sulfur or through application of radical forming compounds, such as azo- or peroxide-containing compounds.

"The term "uncrosslinked polymer, preferably uncrosslinked elastomeric polymer" is intended to mean the uncrosslinked precursor polymers of the above described crosslinked elastomeric polymers. It is noted that "uncrosslinked elastomeric polymers" comprise a predominant amount of polymer in uncrosslinked form, but may also comprise minor amounts of polymer in crosslinked form. The crosslinking degree, when measured as polymer gel content, corresponds to a gel concentration of less than 25 weight percent, preferably of less than 10 weight percent, more preferably of less than 5 weight percent, and even more preferably less than 2 weight percent, based on the weight of the polymer. Preferably, the crosslinking degree, of a crosslinked polymer, including a vulcanized polymer, corresponds to a gel concentration of more than 50 weight percent, more preferably more than 75 weight percent and even more preferably more than 90 weight percent, based on the weight of the polymer. Gel content can be determined by dissolving about 0.2 grams of polymer in 150 ml of toluene, for 24 hours at ambient temperature, separating the insolubles, drying the insolubles, and measuring the amount of insolubles.

The term "polymers, preferably elastomeric polymers," if used as such, includes both above defined groups, "crosslinked-" and "uncrosslinked elastomeric polymers."

Uncrosslinked polymers, preferably uncrosslinked elastomeric polymers, according to the invention, for use in compounds in the presence of above defined modifying agents, can be prepared preferably by polymerization using coordination catalysts in the presence of a solvent or by anionic polymerization. Coordination catalysts in this connection are understood to be Ziegler-Natta catalysts, coordination catalysts and mono-metallic catalyst systems. Coordination catalysts are preferably those based on nickel, cobalt, titanium, vanadium, chromium or neodymium. Catalysts for anionic solution polymerization are based on alkali or alkaline earth metals.

As discussed above, lithium initiators can be used to polymerize conjugated diene, triene, and monovinyl aliphatic and aromatic monomers (anionic solution polymerization). These polymerizations proceed according to anionic polymerization mechanisms, wherein the reaction of monomers is by nucleophilic initiation to form and propagate a polymeric structure. Throughout the polymerization, the polymer structure is ionic or "living." Thus, the polymer structure has at least one reactive or "living" end. This is the context of the term "living," as used herein, to describe those uncrosslinked elastomeric polymers prepared by an anionic solution polymerization technology.

Monomers useful in preparing the subject uncrosslinked elastomeric polymers include conjugated olefins and olefins chosen from the group comprising α-olefins (preferably aromatic α-olefins), internal olefins, cyclic olefins, polar olefins and nonconjugated diolefins. Suitable conjugated unsaturated monomers are preferably conjugated dienes, such as 1,3-butadiene, 2-alkyl-1,3-butadiene, preferably, isoprene(2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene.

Preferred olefins are $C_{2-20}$ α-olefins, including, but not limited to, long chain macromolecular α-olefins, and preferably a $C_{6-20}$ aromatic α-olefins, such as an aromatic vinyl compound. Preferred aromatic vinyl compounds are styrene, including $C_{1-4}$ alkyl substituted styrene, such as 2-methylstyrene, 3-methylstyrene, 4-methylstyrene, 2,4-dimethylstyrene, 2,4,6-trimethylstyrene, α-methylstyrene and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, tert-butoxystyrene, vinylpyridine, and mixtures thereof.

Examples of applicable uncrosslinked polymers, preferably uncrosslinked elastomeric polymers, include, but are not limited to, homopolymers of conjugated dienes, especially butadiene or isoprene, and random or block co- and terpolymers of at least one conjugated diene, especially butadiene or isoprene, with at least one conjugated diene or with at least one aromatic α-olefin and especially styrene and 4-methylstyrene, aromatic diolefin, especially divinylbenzene. Especially preferred is the random copolymerization, optionally terpolymerization, of at least one conjugated diene with at least one aromatic α-olefin, and optionally at least one aromatic diolefin or aliphatic α-olefin, and especially butadiene or isoprene with styrene, 4-methylstyrene and/or divinylbenzene. Additionally, especially preferred is the random copolymerization of butadiene with isoprene.

Examples of applicable polymers include the following:
BR—polybutadiene, CR—polychloroprene, IR—polyisoprene,
SBR—styrene/butadiene copolymers with styrene unit content of 1 to 60 weight percent, preferably 20 to 50 weight percent, based on the total weight of the copolymer,
IIR—isobutylene/isoprene copolymers,
NBR—butadiene/acrylonitrile copolymers with acrylonitrile unit content of 5 to 60 weight percent, preferably 20 to 50 weight percent, based on the total weight of the copolymer, and mixtures of theses rubbers.

In one embodiment, polymer is a polybutadiene.

In another embodiment, the elastomeric polymer is a butadiene/C1-C4-alkyl acrylate copolymer.

In another embodiment, the polymer is a butadiene/styrene copolymer.

In another embodiment, the polymer is a polychloroprene.

In another embodiment, the polymer is a polyisoprene.

In another embodiment, the polymer is a styrene/butadiene copolymer with a styrene unit content of 1 to 60 weight percent, preferably 20 to 50 weight percent, based on the total weight of the copolymer.

In another embodiment, the polymer is an isobutylene/isoprene copolymer.

In another embodiment, the elastomeric polymer is a partially hydrogenated or fully hydrogenated NBR rubber.

For producing vehicle tires, natural rubber, emulsion SBR and solution SBR rubbers with a glass transition temperature above −50° C., polybutadiene rubber with a high cis 1,4 content (>90%), which has been prepared using catalysts based on nickel, cobalt, titanium or neodymium, and polybutadiene rubber with a vinyl content of 0 to 75%, and their mixtures, are of particular interest.

For producing vehicle tires, furthermore, the following polymers are of interest: polybutadiene rubber with a high trans 1,4 content (>75%), or SBR preferably containing between 5 and 40 weight percent styrene and a high trans 1,4-polybutadiene content (>75%) of the polybutadiene fraction of the copolymer. Each type of polymer (SBR or BR) can be prepared with one or more initiator compounds comprising earth alkaline metal compounds, such as described for example in U.S. Pat. Nos. 6,693,160; 6,627,715; 6,489,415; 6,103,842; 5,753,579; 5,086,136 and 3,629,213, incorporated herein as reference, or by using catalysts based on cobalt, such as described for example in U.S. Pat. Nos. 6,310,152; 5,834,573; 5,753,761; 5,448,002 and 5,089,574, and U.S. Publication No. 20030065114, or by using catalysts based on vanadium, such as described for example in European Patent Application No. 1367069; Japanese Patent Application No. 11301794 and U.S. Pat. No. 3,951,936, or by using catalysts based on neodymium, such as described, for example, in European Patent Application Nos. EP0964008 and EP0924214 and in U.S. Pat. Nos. 6,184,168; 6,018,007; 4,931,376; 5,134,199 and 4,689,368.

Although there are no specific limitations regarding the amount of aromatic alpha-olefin used in the subject modified polymer, in most applications the aromatic vinyl monomers comprise from 5 to 60 weight percentage of the total monomer content, and more preferably from 10 to 50 weight percentage (based on total weight of polymer). Values less than 5 weight percentage can lead to reduced wet skid properties, abrasion resistance, and tensile strength; whereas values more than 60 weight percentage lead to increased hysteresis loss.

While dependant upon the specific polymer and desired end use application, the modified polymers of the present invention preferably have Mooney viscosity (ML 1+4, 100° C., as measured in accordance with ASTM D 1646 (2004)) in the range from 20 to 150, and preferably from 45 to 125.

In one embodiment, the preferred molecular weight distribution of the subject modified polymer, represented by the ratio of the weight average molecular weight to the number average molecular weight, ($M_w/M_n$), ranges preferably from 1.3 to 3.0.

Sulfur-containing compounds and peroxides are the most common vulcanizing agents. A vulcanizing accelerator of sulfene amide-type, guanidine-type, or thiuram-type can be used together with a vulcanizing agent, as required. Other additives such as zinc white, vulcanization auxiliaries, aging preventives, processing adjuvants, may be optionally added. A vulcanizing agent is typically added to the polymer composition in an amount from 0.5 to 10 parts by weight, and preferably from 1 to 6 parts by weight, for 100 parts by weight of the total elastomeric polymer. Additional information regarding vulcanizing agents can be found in Kirk-Othmer, Encyclopedia of Chemical technology 3$^{rd}$, Ed, Wiley Interscience, N.Y. 1982, volume 20, pp. 365-468, specifically "Vulcanizing Agents and Auxiliary Materials" pp. 390-402, incorporated herein by reference. A formulation comprising the modified polymer can be prepared by kneading the polymer with other additives, such as an oil and filler. After cooling, one or more vulcanizing agents such as sulfur, vulcanizing accelerator(s), is/are added, and the resulting mixture is blended using a Banbury mixer or open roll mill, formed into a desired shape, and vulcanized at 140° C. to 180° C., thereby obtaining a vulcanized elastomeric product.

The present invention will be explained in more detail by way of examples, which are not intended to be limiting of the present invention.

Experimental

The silanol concentration was determined by combined Gas Chromatography-Mass Spectroscopy (GC-MS). Technical device and measurement data are listed below in Table 2.

TABLE 2

Gas Chromatographic and Mass Spectrometric Conditions

| Mass spectrometric conditions: | | Gas Chromatographic Conditions (HP 6890 GC) | |
|---|---|---|---|
| Mass Spectrometer | MSD 5973 N | Column: | 30 m × 0.25 mm × 0.25 μm RXi 5 MS |
| Ionization mode: | electron impact | Oven program: | 40° C. (1 min) 10°K/min up to 300° C. (3 min) |
| Electron voltage: | 70 V | Carrier gas: | Helium, constant flow of 1 ml/min |
| Emission current: | 35 mA 1 μl | Injection: | split (split ratio: 10) |
| Scan range: | 35-450 Dalton | Injector Temp: | 250° C. |
| Solvent delay: | 3.5 min | Autosampler | MPS 2 |
| Multiplier | 1671 V | | |
| Delay time: | 3 min | | |

The ratio between the 1,4-cis-, 1,4-trans- and 1,2-polydiene content of the butadiene or isoprene polymers was determined by IR, 1H-NMR spectroscopy, and 13C-NMR spectroscopy (NMR (AVANCE 400 device (1H=400 MHz; 13C=100 MHz) of BRUKER ANALYTIC GmbH, CDCl$_3$ (d1-chloroform for both 1H NMR and 13C NMR)). The vinyl content in the conjugated diolefin segments was additionally determined by IR absorption spectrum (Morello method, IFS 66 FT-IR spectrometer of BRUKER ANALYTIC GmbH). The IR samples were prepared using CS2 as swelling agent.

Bonded styrene content was determined using a calibration curve, prepared by IR absorption spectrum (IR (IFS 66 FT-IR spectrometer of BRUKER ANALYTIK GmbH). The JR samples were prepared using CS2 as swelling agent.). The styrene content was alternatively determined by NMR technique (NMR (AVANCE 400 device (1H=400 MHz; 13C=100 MHz) of BRUKER ANALYTIK GmbH, CDCl$_3$ (d1-chloroform for both 1H NMR and 13C NMR)).

A single chain aromatic vinyl compound unit (a unit with an aromatic vinyl compound linked singly) and a long chain aromatic vinyl compound unit (a unit in which eight or more aromatic vinyl compounds are linked) was determined by NMR technique (NMR (AVANCE 400 device (1H=400 MHz; 13C=100 MHz) of BRUKER ANALYTIK GmbH, CDCl$_3$ (d1-chloroform for both 1H NMR and 13C NMR)).

Molecular weight distribution ($M_w/M_n$) was determined from the ratio of polystyrene-reduced weight average molecular weight ($M_w$) and number average molecular weight ($M_n$) which were measured by gel permeation chromatograph (SEC with viscosity detection (universal calibration) in THF at room temperature). Mp corresponds to the weight average molecular weight of the uncoupled polymer. Mp2 corresponds to the weight average molecular weight of the coupled polymer fraction representing 2 arms or 2 polymer chains bonded to the modifying agent. Mp1 corresponds to the weight average molecular weight of the coupled polymer fraction representing 3 arms or 3 polymer chains bonded to the modifying agent. SEC calibrated with narrow distributed polystyrene standard. Instrument: AGILENT SERIE 1100/1200; Module setup: Iso pump, autosampler, thermostate, VW—Detector, RI—Detector, Degasser; Columns PL Mixed B/HP Mixed B. Sample preparation: 1l tetrahydrofurane was stabilized with 20 mg stearylamine. About 9-11 mg dried polymer sample (oil free, moisture content <0.6%) was dissolved in 10 mL tetrahydrofurane, using a brown vial of 10 mL size. The polymer was dissolved by shaking the vial for 20 min at 200 u/min. Polymer solution was transferred into a 2 ml vial using a 0.45 μm disposable filter. The 2 ml vial was placed on a sampler for GPC-analysis. The injection volume: 100.00 μm (GPC-method B 50.00 μm) and the elution rate: 1.00 mL/min Mooney viscosity of the polymer was measured according to ASTM D 1646 (2004) with a preheating time of one minute, and a rotor operation time of four minutes at a temperature of 100° C. [ML1+4(100° C.)], using a MV 2000E from Alpha Technologies UK.

Unless stated to the contrary, the term "overnight" refers to a time of approximately 16-18 hours, and the term "room temperature" refers to a temperature of about 20-25° C.

EXAMPLES

The following Examples are provided in order to further illustrate the invention and are not to be construed as limiting.

Chain End Modifier 1 is represented by Formula 21 below:

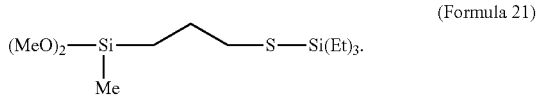

(Formula 21)

Silanol 1 is represented by Formula 4 below

HO—Si(Et)$_3$ (Formula 4).

Silanol 2 is represented by Formula 5 below:

HO—Si((CH$_2$)$_5$CH$_3$)$_3$ (Formula 5).

Silanol 3 is represented by Formula 6 below:

(Formula 6)

Preparation of Silanol 1 from Chain End Modifier 1

The End Modifier 1 (1 mmol; 295 mg) was diluted with dry cyclohexane (1 kg), and than placed in a 10 L laboratory stripper vessel, already containing 2 L hot water. The 10 L glass stripper vessel was equipped with a bottom valve, an internal discharge pipe, a connection for a condenser, and a top opening, which could be sealed with a stainless steel plate. The discharge pipe was used to transfer steam from an external steam generator into the bottom of the stripper glass vessel. The condenser on top of the stripper vessel was connected with a solid carbon dioxide/isopropanol cooled trap. After closing the stripper vessel, the stripping process was initiated (steam was transferred into the stripper vessel), and continued, until all cyclohexane was removed from the stripping vessel. Cyclohexane, off-distilled reaction products of the End Modifier 1, and water, were trapped and analyzed by GC-MS. Results are shown below.

Reference Sample (Modifier 1 in dry cyclohexane): 0.5 ppm Silanol 1

Cyclohexane recovered after steam stripping experiment: 64 ppm Silanol 1

Preparation of Silanol 1 from Chain End Modified Polymer (Ex. 1 in Table 4 Below)

The polymer solution of Example 1 (properties see Tables 4 to 6; polymer preparation see below) was placed in the above described 10 L laboratory stripper vessel, already containing 2 L hot water. After closing the stripper vessel, the stripping process was started (steam was transferred into the stripper vessel). Cyclohexane, off-distilled reaction products of End Modifier 1, and water, were trapped and analyzed by GC-MS. The solvent free polymer remaining was removed from stripper vessel and dried. The GC-MS results are shown below.

Reference Sample (Modifier 1 in dry cyclohexane): 0.5 ppm Silanol 1

Cyclohexane recovered after steam stripping experiment: 64 ppm Silanol 1

Procedure of the Copolymerization of 1,3-Butadiene with Styrene (Examples 1-3)

Each co-polymerization was performed in a double wall, 20 liter steel reactor, which was first purged with nitrogen before the addition of organic solvent, monomers, polar coordinator compound, initiator compound or other components. The polymerization reactor was tempered to 60° C., unless stated otherwise. The following components were than added in the following order: cyclohexane solvent (9000 grams); butadiene monomer, styrene monomer, and tetramethylethylene diamine (TMEDA). The mixture was stirred for one hour, followed by titration with n-butyl lithium to remove traces of moisture or other impurities. After completion of the titration reaction, the additional Silanol 1 quantities of Example 2 and Example 3, diluted with 20 mL cyclohexane solvent, were transferred into the polymerization reactor using a stainless steel dosing cylinder. Then additional n-butyl lithium was added as to start the polymerization reactions of Examples 1 to 3.

The polymerization was performed for 80 minutes, not allowing the polymerization temperature to exceed 60° C. Afterwards, 0.5% of the total amount of butadiene monomer was added, followed by the addition of the coupling agent. The mixture was stirred for 20 minutes. Subsequently, 1.8% of the total amount of butadiene monomer was added, followed by the addition of the Chain-End Modifier 1, unless stated otherwise. To terminate the polymerization process, the polymer solution was transferred, after 45 minutes, into a separate double wall steel reactor, containing 100 mL methanol and 5 g IRGANOX 1520 as stabilizer for the polymer. This mixture was stirred for 15 minutes. The resulting polymer solution was than stripped with steam for one hour to remove solvent and other volatiles, and then dried in an oven at 70° C., for 30 minutes, and than additionally for one to three days at room temperature.

The resulting polymer composition and several of its properties are summarized in Tables 3-5 below. The percent monomer conversion and polymer microstructure are shown in Table 5. Unless otherwise stated, quantities are expressed in mmols. The examples were prepared under identical polymerization conditions, unless particularly stated otherwise.

TABLE 3

Composition of Examples

| EX. | Silanol 1 mmoles | Cyclohexane (moles) | Chain-End Modifier (mmoles) | Coupling Agent (mmoles) | Butadiene (moles) | Styrene (moles) | TMEDA | n-butyl lithium moles |
|---|---|---|---|---|---|---|---|---|
| 1 | 0 | 54.7 | (1) 3.762 | [TTC* 0.308] | 12.97 | 1.81 | 8.88 | 4.52 |
| 2 | 2.21 | 54.7 + 19.1** | (1) 3.98 | [TTC* 0.302] | 12.98 | 1.80 | 8.87 | 4.43 |
| 3 | 6.23 | 54.7 | (1) 3.87 | [TTC* 0.305] | 12.98 | 1.80 | 8.88 | 4.46 |

*TTC . . . tin tetrachloride - unmodified coupling agent reference
**added prior to polymer chain coupling due to the high polymer viscosity

TABLE 4

Polymer Molecular Weight Properties

| EX. | Mw [g/mol] | Mn [g/mol] | Mp [g/mol] | Mp1 [g/mol] | Mp2 [g/mol] | Coupling Rate [%] | Mooney viscosity [MU] |
|---|---|---|---|---|---|---|---|
| 1 | 455,789 | 314,113 | 296,572 | 1033823 | 738338 | 26.1 | 61.4 |
| 2* | 1,017,915 | 616,355 | 607,916 | 1754912 | — | 44.0 | 94.8 |
| 3** | 1,862,623 | 847,332 | 817,692 | Not det. | Not det. | Not det. | 119 |

Not det. means the values were not determined.
*Silanol consuming initiator - results in higher molecular weight polymer chains.
**Silanol consuming most of the initiator - results in much higher molecular weight polymer chains and a relatively low monomer conversion.

TABLE 5

Polymer Structure and Monomer Conversion

| EX. | Vinyl content* [wt %] | Styrene content** [wt %] | Monomer Conversion [%] |
|---|---|---|---|
| 1 | 63.61 | 21.0 | 99.9 |
| 2 | 62.3 | 21.2 | 97.8 |
| 3 | 62.8 | 21.0 | 2.7 |

*Weight percent of 1,2-polybutadiene units, based on the total polybutadiene content of the copolymer.
**Weight percent styrene of the copolymer (based on weight of copolymer).

Coupling Rate

The total coupling rate (CR(total)) represents the sum of the weight fractions of coupled polymers relative to the total polymer weight, including the sum of the weight fractions of all coupled polymers and the uncoupled polymer. The total coupling rate is calculated as shown below.

CR(total)=(ΣArea fraction of all coupled peaks [Peak with maximum Mp2 to peak with highest indexed peak maximum])/(ΣArea fraction of all peaks [Peak with peak maximum Mp1 to peak with highest indexed peak maximum]).

Vinyl and Styrene Content Determination

For the IR determination of the bound styrene in styrene-butadiene copolymers are four bands viewed: a) band for trans-1,4-polybutadiene units at 966 cm$^{-1}$, b) band for cis-1,4-polybutadiene units at 730 cm$^{-1}$, c) band for 1,2-polybutadiene units at 910 cm$^{-1}$, and band for bound styrene (styrene aromatic bond) at 700 cm$^{-1}$. The band heights are normed according to the appropriate extinction coefficients and summarized to a total of 100%. The normalization is done via 1H- and 13-C-NMR. The styrene content was alternatively determined by NMR technique (NMR (AVANCE 400 device (1H=400 MHz; 13C=100 MHz) of BRUKER ANALYTIK GmbH, CDCl$_3$)).

Monomer Conversion via Polymer Solid Content Determination

The solid content of the final polymer solution was determined by application of a thermo-gravimetric method.

Solid Content Determination: The polymer solution is placed on an aluminum dish of known weight, balanced, and afterwards, placed in a HR73 METTLER TOLEDO HALOGEN MOISTURE ANALYZER. There the solvent is evaporated at a temperature of 140° C. using infrared radiation. The analyzer measured the sample weight every 50 seconds. When five successive values do not distinguish by more than 1 mg, the measurement is stopped. At this point, it is assumed, that the polymer sample weight is constant, and polymer is balanced again to determine the final polymer sample weight.

The following calculation is performed for determination of the solid content:

Solid Content=Amount of dry Polymer/Amount of polymer solution×100.

The polymer formed as result of the polymerization experiment (called polymer yield) is calculated from the solid content according to the following calculation:

Polymer Yield=(Total Amount of All Components Added to the Polymerization Vessel×Solid Content)/100.

The monomer conversion is calculated according to the following calculation:

Monomer Conversion=(Polymer Yield/Total Amount of Monomers Dosed into the Polymerization Reactor)×100.

The polymerization, according to Example 1 (see Table 4), represents the reference polymerization. A low Silanol 1 concentration of 2.21 mmol (Example 2) leads to a significant increase of the polymer molecular weight, such as an increase of the average molecular weight M$_w$ from 455,785 g/mol to more than one million g/mol. A further significant increase of Silanol 1 present in the polymerization (Example 3) leads to an almost complete inactivation of the polymerization activator. Thus, according to Example 3 hardly any polymerization (monomer conversion degree only 2.7%—see Table 6) occurs.

The Removal of Silanols by Using Alumina

Applied alumina, type 507-C neutral (aluminum oxide for column chromatographic adsorption analysis according to Brockmann), was purchased from CAMAG Chemie Erzeugnisse and Adsorptionstechnik AG.

Alumina type 507-C neutral particle size: 0.040-0.160 mm
Alumina type 507-C neutral mean pore size: 6 nm
Alumina type 507-C neutral pH-value: at 100 g/L H$_2$O (20° C.) 6.5-7.5 (slurry)

Alumina Activation—General Procedure

Alumina 507-C neutral (100 g) was heated in an oven at 250° C. for three hours. Afterwards, the alumina was poured into a hot "250 mL round bottom glass vessel," which was than closed and connected to a vacuum line. At a reduced pressure (−0.5 mbar) the alumina was cooled down to room temperature (20-24° C.), and than transferred into a glove box system. There, the alumina containing vessel was purged with nitrogen. Than the activated alumina containing vessel was closed and stored under nitrogen atmosphere.

A 500 mL Schlenk vessel was first purged with nitrogen before the addition of 200 g cyclohexane and 20.5 mg of Silanol 1, Silanol 2, Silanol 3 or hexamethyldisiloxane. The solution was stirred for five minutes. Than a 0.5 ml aliquot of the solution (reference sample a) was removed for a GC-MS determination. Afterwards, activated alumina (10 g) was added into the Schlenk vessel. The suspension was than stirred for additional five minutes, and a second aliquot (sample b) was removed from the Schlenk vessel. The content of the Schlenk vessel was than stirred for additional five minutes before a third aliquot (sample c) was removed from the Schlenk vessel. All sample aliquots were visually free of alumina. The individual silanol sample concentration was than determined by GC-MS. The results are shown below.

Removal of Silanol 1 (Triethylsilanol)
Reference Sample a) 88 ppm Silanol 1
5 minutes contact period sample b) <1 ppm Silanol 1
20 minutes contact period sample c) <1 ppm Silanol 1
Removal of Silanol 2 (Trihexylsilanol)
Reference Sample a) 92 ppm Silanol 2
5 minutes contact period sample b) <1 ppm Silanol 2
20 minutes contact period sample c) <1 ppm Silanol 2
Removal of Silanol 3 (tea Butyl-dimethyl-silanol)
Reference Sample a) 89 ppm Silanol 3
5 minutes contact period sample b) <1 ppm Silanol 3
20 minutes contact period sample c) <1 ppm Silanol 3
Removal of hexamethyldisiloxane
Reference Sample a) 112 ppm hexamethyldisiloxane
5 minutes contact period sample b) 108 ppm hexamethyldisiloxane
20 minutes contact period sample c) 108 ppm hexamethyldisiloxane Hexamethyldisiloxane is represented by Formula 22 below

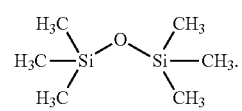

(Formula 22)

As shown from the results above, the contact of the silanol solution with the activated alumina significantly reduced the amount of silanol in the solution phase. A compounds of similar structure but lacking an Si—OH group, such as, for example, hexamethyldisiloxane, was not removed on the chosen activated alumina.

Efficiency of Regenerated Alumina

Experiment Ex. No. 1a (see Table 6):

Alumina, CAMAG 507-C neutral, was activated as described above, in a Schlenk vessel. Then, in a separate Schlenk vessel, Silanol 1 (21.0 mg) was added to of 200 g cyclohexane, and the solution was stirred for five minutes. Then, a 0.2 ml aliquot of the solution (reference sample 1a prior to contact with alumina) was removed for a GC-MS determination representing sample S. No. 1a-1. Afterwards, activated alumina (2.5 g) was added into the Schlenk vessel containing stated "21.0 mg of Silanol 1 in 200 g cyclohexane." The suspension was than stirred for additional five minutes, and a second aliquot (Sample 1a, sample after contact with alumina) was removed from the Schlenk vessel for a GC-MS determination (S. No. 1a-2).

Preparation of "Regenerated Alumina" for Experiment Ex. No. 2a and 2b

A second Schlenk vessel was first purged with nitrogen before the addition of 5 g of the same "charge activated CAMAG 507-C neutral" used for the preparation of Sample 1a-2. Afterwards, the alumina in the Schlenk vessel was covered completely with 15 g of Silanol 1, which was added into the vessel, and the mixture was stored for three days. After three days, the Silanol 1 was removed under low pressure (vacuum), and the dry alumina was again activated as described above.

Experiment Ex. No. 2a (see Table 6)

The reactivated alumina (2.5 g) was then used for Ex. No. 2a.

The concentration of Silanol 1 in pure cyclohexane (cyclohexane not containing added Silanol 1) was determined by using GC-MS measurements, prior to the addition of the cyclohexane to reactivated alumina (sample S. No. 2a-1). Then, 2.5 g of the reactivated alumina, followed by 80 g cyclohexane, were added to a Schlenk vessel. The solution was stirred for five minutes. Then a 0.5 ml aliquot of the solution was removed for a GC-MS determination (sample S. No. 2a-2). Afterwards the cyclohexane solvent was removed using low pressure and a temperature of 30° C. The resulting solvent free alumina was used for experiment Ex. No. 2b.

Experiment Ex. No. 2b (see Table 6)

Cyclohexane (80 g) and Silanol 1 (20.5 mg) were added to a Schlenk vessel. The solution was stirred for five minutes. Then, a 0.5 ml aliquot of the solution (Sample S. No. 2b-1) was removed for a GC-MS determination. Stated solution of "20.5 mg Silanol 1 in 80 g cyclohexane" was then added to the reactivated alumina obtained after completion of experiment Ex. No. 2a. The solution was stirred for five minutes. Then a 0.5 ml aliquot of the solution was removed for a GC-MS determination (sample S. No. 2b-2).

All sample aliquots were visually free of alumina. The individual silanol sample concentration was determined by GC-MS. The results are shown in Table 7 below.

TABLE 6

Analysis of Cyclohexanes Prior To and After Treatment with Activated or Regenerated Alumina

| Experiment-No. | Alumina$^2$ [g]$^4$ | Silanol 1 - after contact with alumina$^2$- [ppm]$^3$ | Silanol 1* - prior to contact with alumina$^2$- [ppm]$^1$ |
|---|---|---|---|
| Ex. No. 2a | 2.5 Reactivated*** | <1 S. No. 2a-2 | 0 (0 mg)** S. No. 2a-1 |
| Ex. No. 2b | 2.5 Reactivated*** | 50 (4 mg) S. No. 2b-2 | 256 (20.5 mg)** S. No. 2b-1 |

TABLE 6-continued

Analysis of Cyclohexanes Prior To and After Treatment with Activated or Regenerated Alumina

| Experiment-No. | Alumina$^2$ [g]$^4$ | Silanol 1 - after contact with alumina$^2$- [ppm]$^3$ | Silanol 1* - prior to contact with alumina$^2$- [ppm]$^1$ |
|---|---|---|---|
| Ex. No. 1a | 2.5**** | <1 (0.2 ppm) S. No. 1a-2 | 105 (21.0 mg)* S. No. 1a-1 |

*Silanol 1 amount diluted in 200 g Cyclohexane
**Silanol 1 amount diluted in 80 g Cyclohexane
***Alumina reactivated after exposure to 15 g Silanol 1 for three days.
****Activated alumina, which was not exposed to Silanol 1 before
$^1$ppm means parts of Silanol 1 per million parts of cyclohexane was calculated from the balanced amount of Silanol 1 added to the stated balanced amount of cyclohexane prior to addition of alumina.
$^2$For each sample, Typ CAMAG 507-C neutral was used.
$^3$ppm means parts of Silanol 1 per million parts of cyclohexane as determined by gas chromatography (GC) after exposure of the Silanol 1 in cyclohexane solution to 2.5 g of alumina for 5 minutes.
$^4$g is the unit for gram
S. means sample Although an almost identical amount of Silanol 1 was contacted with the reactivation alumina, an increased Silanol 1 concentration was observed after contact with this alumina. This observation indicates that at least some alumina surface —OH groups were not available to react with Silanol 1 after reactivation of alumina.

Different pH grades of One Alumina Source

Different pH grades of an alumina source were investigated for silanol removal efficiency applying the procedure as described below (see Table 7).

The Silanol 3 concentration of pure cyclohexane (distilled and dried) was determined (sample S. No. 6-1). A 500 mL Schlenk vessel was first purged with nitrogen before the addition of 200 g cyclohexane and the alumina. The solution was stirred for five minutes. Than a 0.5 ml aliquot of the solution (sample S. No. 6-2) was removed for a GC-MS determination. Sample S. No. 6-2 was a reference for Sample S. No. 3-2, S. No. 4-2 and S. No. 5-2 (see Table 8), and demonstrated that no silanol could be detected when no silanol was added). For Experiment Ex. No. 3, Ex. No. 4 and Ex. No. 5, different silanol 3 concentrations were added to 200 g cyclohexane. The silanol concentrations in ppm, prior to contact of the silanol 3 in cyclohexane solution with alumina, were calculated from the balanced amount of silanol added to a balanced amount of cyclohexane (calculated values V. No. 3-1; V. No. 4-1 and V. No. 5-1). Afterwards, activated alumina (2.5 g, basic, acidic, or neutral) was added into the Schlenk vessel. The suspension was than stirred for additional five minutes, and an aliquot (Samples S. No. 3-2, S. No. 4-2, or S. No. 5-2) was removed from the Schlenk vessel. All sample aliquots were visually free of alumina. The individual Silanol 3 concentration was than determined by GC-MS. The results, as well as the amounts and types of alumina, and the amounts of Silanol 3, are shown in Table 7 below.

The results on the removal of Silanol 3 using basic, acidic, or neutral alumina, show that there are no strong differences on silanol adsorption. The different alumina grades gave different pH-values in water.

TABLE 7

Removal of Silanol 3

| Experiment-No. | Alumina [g]$^3$ | Silanol 3 - after contact with alumina- [ppm]$^1$ | Silanol 3 - prior to contact with alumina- [ppm]$^2$ |
|---|---|---|---|
| Ex. No. 6 | 2.5** | <1 S. No. 6-2 | 0 (0 mg)* S. No. 6-1 |
| Ex. No. 5 | 2.5** | 48 (9.6 mg) S. No. 5-2 | 250 (50 mg)* V. No. 5-1 |

TABLE 7-continued

Removal of Silanol 3

| Experiment-No. | Alumina [g]³ | Silanol 3 - after contact with alumina- [ppm]¹ | Silanol 3 - prior to contact with alumina- [ppm]² |
|---|---|---|---|
| Ex. No. 4 | 2.5**** | 58 (11.6 mg) S. No. 4-2 | 250 (50 mg)* V. No. 4-1 |
| Ex. No. 3 | 2.5*** | 62 (12.4 mg) S. No. 3-2 | 250 (50 mg)* V. No. 3-1 |

¹ppm means parts of Silanol 3 per million parts of cyclohexane as determined by gas chromatography (GC) after exposure of the Silanol 3 in cyclohexane solution to 2.5 g of alumina for 5 minutes Silanol 3 measured in 200 g cyclohexane
²ppm means parts of Silanol 3 per million parts of cyclohexane was calculated from the balanced amount of Silanol 3 added to 200 g of cyclohexane prior to addition of alumina
³g is the unit for gram
*Amount (mg) of Silanol 3
**Typ CAMAG 507-C neutral
***Typ CAMAG 5016-A-1 (pH: 9.5) basic
****Typ CAMAG 504-C-1 (pH: 4.5) acid
S. means sample
V. means calculated value Different Alumina Sources Four alumina samples were tested for silanol (tert-butyldimethylsilanol) removal, using a ratio of alumina to silanol of "2.5 g, 5.0 g or 10 g" to "50 mg," in 100 g cyclohexane. Results are shown in Table 8. One alumina sample was tested for silanol (trimethylsilanol) removal, using a ratio of alumina to silanol of 10 g to 50 mg, in 100 g cyclohexane. Results are shown in Table 8.

Alumina activation (analogous activation of CAMAG 507-C as reported above):

a) Four hours heating at 200° C., b) Cool down to room temperature under reduced pressure, and c) Storage and handling under nitrogen atmosphere.

Alumina CAMAG-507-C showed the best silanol removal. Alumina UOP AZ-300 (Adsorbent 7×14) showed very good silanol removal.

TABLE 8

Analyses of Silanol Containing Cyclohexane After Treatment with Different Activated Alumina Sources

| Alumina Type | Alumina [g] | tert-butyldimethylsilanol- after treatment with alumina- measured by GC [ppm]/[mg] | tert-butyldimethylsilanol- prior to treatment with alumina-calculated [ppm]/[mg] |
|---|---|---|---|
| CAMAG-507-C neutral | 2.5 | 30/6 | 250/50.0* |
| UOP D-201 Activated Alumina***** | 2.5 | 259/51.8 | 250/50.0* |
| UOP D-201 Activated Alumina***** | 5.0 | 182/36.4 | 250/50.0* |
| UOP AZ-300 Adsorbent**** | 5.0 | 166/33.2 | 250/50.0* |
| UOP CG-731 Adsorbent | 5.0 | 178/35.6 | 250/50.0* |
| UOP 9139A Activated Alumina | 5.0 | 216/43.2 | 250/50.0* |
| Reference (without Alumina) | | 481/48.1 | 500/50.0** |
| UOP D-201 Activated Alumina***** | 10.0 | 102/10.2 | 500/50.0** |
| UOP-AZ-300 Adsorbent**** | 10.0 | 48/4.8 | 500/50.0** |
| UOP-CG-731 | 10.0 | 119/11.9 | 500/50.0** |
| UOP 9139A Activated Alumina | 10.0 | 246/24.6 | 500/50.0** |

| Alumina [g] | Alumina [g] | trimethylsilanol- after treatment with alumina- measured by GC [ppm]/[mg] | trimethylsilanol- prior to treatment with alumina-calculated [ppm]/[mg] |
|---|---|---|---|
| Reference (without Alumina) | | 519/51.9 | 500/50.0*** |
| UOP AZ-300 Adsorbent**** | 10.0 | 6/0.6 | 500/50.0*** |

*tert.butyldimethylsilanol dissolved in 200 g Cyclohexane; 5 min stirring after Alumina-addition
**tert.butyldimethylsilanol dissolved in 100 g Cyclohexane; 10 min stirring after Alumina-addition
***Trimethylsilanol amount dissolved in 100 g Cyclohexane; 10 min stirring after Alumina-addition
****7 × 14 mesh (2.8 mm × 1.4 mm) (1/16 inch nominal)
*****7 × 12 mesh (2.8 mm × 1.4 mm) (1/16 inch nominal)
UOP AZ-300 adsorbent 7 × 14 Grade Information from UOP:
a) MSDS information
aluminum oxide content    <90 wt %
zeolithe content    <30 wt %
water    <15 wt %
UOP 9139A Activated Alumina Grade Information from UOP:
a) MSDS information
aluminum oxide content    <95 wt %
sodium oxide content    <15 wt %
water    <15 wt %
UOP D-201 Activated Alumina 7 × 12 Grade Information from UOP:
a) MSDS information
aluminum oxide content    <95 wt %
water    <15 wt %
UOP CG-731 Activated Alumina 7 × 12 Grade Information from UOP:
a) MSDS information
aluminum oxide content (wt %)    <95
water (wt %)    <15
sodium oxide (wt %)    <10

Although the invention has been described in certain detail through the preceding specific embodiments, this detail is for the primary purpose of illustration. Many variations and modifications can be made by one skilled in the art, without departing from the spirit and scope of the invention, as described in the following claims.

The invention claimed is:

1. A method for a preparation of a polymer selected from the following: (a) modified interpolymer comprising, in polymerized form, a conjugated diene and an aromatic alpha-olefin, or (b) a modified polymer comprising, in polymerized form, a conjugated diene; and wherein said method comprising at least the following steps:

polymerizing monomers comprising at least one conjugated diene monomer in at least one polymerization reactor, in the presence of at least one solvent, to form the polymer, optionally coupling a fraction of the polymer chains using at least one coupling agent, modifying the polymer with at least one modifying agent, in at least one reactor, in the presence of the at least one solvent, to form a modified polymer solution;

optionally, contacting the modified polymer solution with at least one proton donating compound;

contacting the modified polymer solution with water to form a silanol;

removing the at least one solvent;

contacting the removed solvent with at least one material that will react with, and/or adsorb, the silanol to form a purified solvent, recirculating the purified solvent back to the at least one polymerization reactor or to a storage container.

2. The method of claim 1, wherein the at least one solvent comprises cyclohexane.

3. The method of claim 1, wherein the at least one solvent further comprises an alkane.

4. The method of claim 1, wherein the polymer is a modified interpolymer comprising, in polymerized form, a conjugated diene and an aromatic alpha-olefin.

5. The method of claim 1, wherein the polymerization takes place by a consecutive batch-wise polymerization or a continuous polymerization.

6. The method of claim 1, wherein the material comprises alumina, silica, and/or aluminosilicates.

7. The method of claim 1, wherein the at least one material is contained in a column.

8. The method of claim 1, wherein the silanol is selected from a compound according to Formula 3:

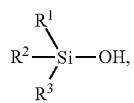

Formula 3 wherein:

Si is silicon; O is oxygen; H is hydrogen;

$R^1$, $R^2$ and $R^3$ are the same or different, and are each, independently, a group having from 1 to 80 nonhydrogen atoms, and which is hydrocarbyl, and wherein each hydrocarbyl group, independently, may be linear or branched, saturated or unsaturated, and wherein each hydrocarbyl group, independently, may be optionally substituted with a $(C_1-C_4)$ alkyl, a $(C_1-C_4)$ alkoxy, a $(C_6-C_{16})$ aryl, a $(C_7-C_{16})$ aralkyl, or combinations thereof.

9. The method of claim 1, wherein the silanol is selected from one or more of the following compounds:

 (Formula 4)

 (Formula 5)

 (Formula 6)

 (Formula 7)

10. The method of claim 1, wherein the modified polymer is selected from a modified butadiene-styrene copolymer or a modified polybutadiene.

11. The method of claim 1, wherein the modifying agent is selected from one or more of the following A) through E):

A) $(R^1O)_3Si-R^4-S-SiR^3_3$ (Formula 8), wherein:

Si is silicon; S is sulfur; O is oxygen; N is nitrogen;

$R^4$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_6-C_{16})$ aryl, a $(C_7-C_{16})$ aralkyl, an amine, a thioalkyl, or combinations thereof; and wherein each alkyl may be linear or branched, and saturated or unsaturated;

$R^1$ and $R^3$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ tri(hydrocarbyl)silyl, and wherein the hydrocarbyl groups are each, independently, selected from a $(C_1-C_{16})$ alkyl, a $(C_6-C_{16})$ aryl, or a $(C_7-C_{16})$ aralkyl;

B) $(R^{13}O)_3Si-R^9-N(SiR^{10}R^{11}R^{12})_2$ (Formula 9), wherein:

Si is silicon; S is sulfur; 0 is oxygen; N is nitrogen;

$R^9$ is a group selected from a $(C_7-C_{100})$ aralkyl, a $(C_6-C_{100})$ aryl, a $(C_1-C_{100})$ alkyl, or a $(C_2-C_{100})$ dialkylether (alkyl-O-alkyl), and wherein each group is optionally substituted with at least one of the following: a $(C_1-C_4)$ alkyl, a $(C_1-C_4)$ alkoxy, a $(C_6-C_{16})$ aryl, a $(C_7-C_{16})$ aralkyl, an amine, a thioalkyl, or combinations thereof; and wherein each alkyl may be linear or branched, and saturated or unsaturated;

$R^{10}$, $R^{11}$, $R^{12}$ and $R^{13}$ are the same or different, and are each, independently, selected from hydrogen (H), a $(C_1-C_{16})$ alkyl, a $(C_6-C_{16})$ aryl, a $(C_7-C_{16})$ aralkyl, or a $(C_3-C_{30})$ tri(hydrocarbyl)silyl, and wherein the hydrocarbyl groups are each, independently, selected from a $(C_1-C_{16})$ alkyl, a $(C_6-C_{16})$ aryl, or a $(C_6-C_{16})$ aralkyl;

C) $(R^1O)_x(R^2)_ySi-R^4-S-SiR^3_3$ (Formula 10), wherein:

Si is silicon; S is sulfur; O is oxygen, N is nitrogen, x is an integer selected from 1, and 2;

y is an integer selected from 1, and 2;

x+y=3;

R⁴ is a group selected from a $(C_7\text{-}C_{100})$ aralkyl, a $(C_6\text{-}C_{100})$ aryl, a $(C_1\text{-}C_{100})$ alkyl, or a $(C_2\text{-}C_{100})$ dialkylether (alkyl-O-alkyl), and wherein each group is optionally substituted with at least one of the following: a $(C_1\text{-}C_4)$ alkyl, a $(C_1\text{-}C_4)$ alkoxy, a $(C_6\text{-}C_{16})$ aryl, a $(C_7\text{-}C_{16})$ aralkyl, an amine, a thioalkyl, or combinations thereof; and wherein each alkyl may be linear or branched, and saturated or unsaturated;

$R^1$, $R^2$, and $R^3$ are the same or different, and are each, independently, selected from hydrogen (H), a $(C_1\text{-}C_{16})$ alkyl, a $(C_6\text{-}C_{16})$ aryl, a $(C_7\text{-}C_{16})$ aralkyl, or a $(C_3\text{-}C_{30})$ tri(hydrocarbyl)silyl, and wherein the hydrocarbyl groups are each independently selected from a $(C_1\text{-}C_{16})$ alkyl, a $(C_6\text{-}C_{16})$ aryl, or a $(C_7\text{-}C_{16})$ aralkyl;

D) $(R^{13}O)_p(R^{14})_q Si-R^9-N(SiR^{10}R^{11}R^{12})_2$ (Formula 11), wherein:

Si is silicon; S is sulfur; O is oxygen; N is nitrogen, p is an integer selected from 1, and 2;

q is an integer selected from 1, and 2;

p+q =3;

$R^9$ is a group selected from a $(C_7\text{-}C_{100})$ aralkyl, a $(C_6\text{-}C_{100})$ aryl, a $(C_1\text{-}C_{100})$ alkyl, or a $(C_2\text{-}C_{100})$ dialkylether (alkyl-O-alkyl), and wherein each group is optionally substituted with at least one of the following: a $(C_1\text{-}C_4)$ alkyl, a $(C_1\text{-}C_4)$ alkoxy, a $(C_6\text{-}C_{16})$ aryl, a $(C_7\text{-}C_{16})$ aralkyl, an amine, a thioalkyl, or combinations thereof; and wherein each alkyl may be linear or branched, and saturated or unsaturated;

$R^{10},R^{11},R^{12},R^{13},R^{14}$ are the same or different, and are each, independently, selected from hydrogen (H), a $(C_1\text{-}C_{16})$ alkyl, a $(C_6\text{-}C_{16})$ aryl, a $(C_7\text{-}C_{16})$ aralkyl, or a $(C_3\text{-}C_{30})$ tri(hydrocarbyl)silyl, and wherein the hydrocarbyl groups are each, independently, selected from a $(C_1\text{-}C_{16})$ alkyl, a $(C_6\text{-}C_{16})$ aryl, or a $(C_7\text{-}C_{16})$ aralkyl;

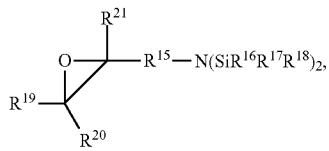

(Formula 12)

E)

wherein:

Si is silicon; S is sulfur; O is oxygen; N is nitrogen, $R^{15}$ is a group selected from a $(C_7\text{-}C_{100})$ aralkyl, a $(C_6\text{-}C_{100})$ aryl, a $(C_2\text{-}C_{100})$ alkyl, or a $(C_2\text{-}C_{100})$ dialkylether (alkyl-O-alkyl), and wherein each group is optionally substituted with at least one of the following: a $(C_1\text{-}C_4)$ alkyl, a $(C_1\text{-}C_4)$ alkoxy, a $(C_6\text{-}C_{16})$ aryl, a $(C_7\text{-}C_{16})$ aralkyl, an amine, a thioalkyl, or combinations thereof; and wherein each alkyl may be linear or branched, and saturated or unsaturated;

$R^{16},R^{17},R^{18},R^{19},R^{20}$, and $R^{21}$ are the same or different, and are each, independently, selected from hydrogen (H), a $(C_1\text{-}C_{16})$ alkyl, a $(C_6\text{-}C_{16})$ aryl, a $(C_7\text{-}C_{16})$ aralkyl, or a $(C_3\text{-}C_{30})$ tri(hydrocarbyl)silyl, and wherein the hydrocarbyl groups are each independently selected from a $(C_1\text{-}C_{16})$ alkyl, a $(C_6\text{-}C_{16})$ aryl, a $(C_7\text{-}C_{16})$ aralkyl, or combinations thereof.

12. The method of claim 1, wherein the at least one solvent is passed through at least two columns connected in series.

13. The method of claim 12, wherein, once a column is exhausted (capacity full), the flow of the at least one solvent by-passes this column, and flows into another column.

14. The method of claim 13, wherein the exhausted column is regenerated or exchanged with new material, and wherein the flow of the at least one solvent is re-routed to again flow into this column.

15. The method of claim 1, wherein the at least one solvent is recycled at a rate from 50 to 70 m³ solvent per hour.

* * * * *